United States Patent
Davis et al.

(10) Patent No.: US 9,311,269 B2
(45) Date of Patent: Apr. 12, 2016

(54) NETWORK PROXY FOR HIGH-PERFORMANCE, LOW-POWER DATA CENTER INTERCONNECT FABRIC

(71) Applicant: III Holdings 2, LLC, Wilmington, DE (US)

(72) Inventors: Mark B Davis, Austin, TX (US); David James Borland, Austin, TX (US); Thomas A Volpe, Austin, TX (US); Kenneth S. Goss, Round Rock, TX (US)

(73) Assignee: III Holdings 2, LLC, Wilmington, DE (US)

( * ) Notice: Subject to any disclaimer, the term of this patent is extended or adjusted under 35 U.S.C. 154(b) by 30 days.

(21) Appl. No.: 13/692,741

(22) Filed: Dec. 3, 2012

(65) Prior Publication Data
US 2014/0359089 A1    Dec. 4, 2014

Related U.S. Application Data

(63) Continuation-in-part of application No. 12/794,996, filed on Jun. 7, 2010, now abandoned.

(60) Provisional application No. 61/256,723, filed on Oct. 30, 2009.

(51) Int. Cl.
*G06F 15/177* (2006.01)
*H04L 12/931* (2013.01)
(Continued)

(52) U.S. Cl.
CPC ............ *G06F 15/177* (2013.01); *G06F 1/3234* (2013.01); *G06F 13/00* (2013.01);
(Continued)

(58) Field of Classification Search
CPC ..... H04L 45/60; H04L 49/3009; H04L 49/25; H04L 45/00; H04L 61/00–61/6095; G06F 13/00; G06F 1/32–1/3296; Y02B 60/41; Y02B 60/30
USPC .......... 370/351–431; 709/212–219, 238–245; 710/22–28, 260–269; 711/100–105, 711/108, 147–153, 170–200; 713/300–340
See application file for complete search history.

(56) References Cited

U.S. PATENT DOCUMENTS

| 5,451,936 A | 9/1995 | Yang et al. |
| 5,594,908 A | 1/1997 | Hyatt |

(Continued)

FOREIGN PATENT DOCUMENTS

| JP | 2005-223753 | 8/2005 |
| JP | 2005-536960 | 12/2005 |

(Continued)

OTHER PUBLICATIONS

PCT/US2010/053227—International Preliminary Report on Patentability dated May 10, 2012 (2 pages).
(Continued)

*Primary Examiner* — Mark Rinehart
*Assistant Examiner* — Kenneth P Hunt

(57) ABSTRACT

A system and method are provided for network proxying. The network proxying may occur in a node of a fabric or across nodes in the fabric. In the network proxying, the node has a processor with a low power mode and the system remaps, by a management processor of the node, a port identifier for a processor that is in a low power mode to the management processor. The management processor then processes a plurality of packets that contain the port identifier for the processor that is in the low power mode to maintain a network presence of the node.

49 Claims, 10 Drawing Sheets

(51) Int. Cl.
*H04L 12/933* (2013.01)
*G06F 13/00* (2006.01)
*G06F 13/24* (2006.01)
*G06F 13/40* (2006.01)
*G06F 1/32* (2006.01)
*H04L 12/701* (2013.01)
*H04L 12/935* (2013.01)
*H04L 12/773* (2013.01)
*H04L 12/947* (2013.01)
*H04L 12/801* (2013.01)

(52) U.S. Cl.
CPC ............... *G06F 13/24* (2013.01); *G06F 13/40* (2013.01); *H04L 45/00* (2013.01); *H04L 45/60* (2013.01); *H04L 49/109* (2013.01); *H04L 49/25* (2013.01); *H04L 49/3009* (2013.01); *H04L 49/351* (2013.01); *H04L 49/356* (2013.01); *H04L 47/10* (2013.01)

(56) References Cited

U.S. PATENT DOCUMENTS

| | | | |
|---|---|---|---|
| 5,623,641 | A | 4/1997 | Kadoyashiki |
| 5,781,187 | A | 7/1998 | Gephardt et al. |
| 5,901,048 | A | 5/1999 | Hu |
| 5,908,468 | A | 6/1999 | Hartmann |
| 5,968,176 | A | 10/1999 | Nessett et al. |
| 5,971,804 | A | 10/1999 | Gallagher et al. |
| 6,141,214 | A | 10/2000 | Ahn |
| 6,181,699 | B1 | 1/2001 | Crinion et al. |
| 6,192,414 | B1 | 2/2001 | Horn |
| 6,198,741 | B1 | 3/2001 | Yoshizawa et al. |
| 6,252,878 | B1 | 6/2001 | Locklear et al. |
| 6,314,501 | B1 | 11/2001 | Gulick et al. |
| 6,373,841 | B1 | 4/2002 | Goh et al. |
| 6,442,137 | B1 | 8/2002 | Yu et al. |
| 6,446,192 | B1 | 9/2002 | Narasimhan et al. |
| 6,452,809 | B1 | 9/2002 | Jackson et al. |
| 6,507,586 | B1 | 1/2003 | Satran et al. |
| 6,556,952 | B1 | 4/2003 | Magro |
| 6,574,238 | B1 | 6/2003 | Thrysoe |
| 6,711,691 | B1 | 3/2004 | Howard et al. |
| 6,766,389 | B2 | 7/2004 | Hayter et al. |
| 6,813,676 | B1 | 11/2004 | Henry et al. |
| 6,816,750 | B1 | 11/2004 | Klaas |
| 6,842,430 | B1 | 1/2005 | Melnik |
| 6,857,026 | B1 | 2/2005 | Cain |
| 6,963,926 | B1 | 11/2005 | Robinson |
| 6,963,948 | B1 | 11/2005 | Gulick |
| 6,977,939 | B2 | 12/2005 | Joy et al. |
| 6,988,170 | B2 | 1/2006 | Barroso et al. |
| 6,990,063 | B1 | 1/2006 | Lenoski et al. |
| 7,020,695 | B1 | 3/2006 | Kundu et al. |
| 7,032,119 | B2 | 4/2006 | Fung |
| 7,080,078 | B1 | 7/2006 | Slaughter et al. |
| 7,080,283 | B1 | 7/2006 | Songer et al. |
| 7,119,591 | B1* | 10/2006 | Lin ............................ 327/158 |
| 7,143,153 | B1 | 11/2006 | Black et al. |
| 7,165,120 | B1 | 1/2007 | Giles et al. |
| 7,170,315 | B2 | 1/2007 | Bakker et al. |
| 7,180,866 | B1 | 2/2007 | Chartre et al. |
| 7,203,063 | B2 | 4/2007 | Bash et al. |
| 7,257,655 | B1 | 8/2007 | Burney et al. |
| 7,263,288 | B1 | 8/2007 | Islam |
| 7,274,705 | B2 | 9/2007 | Chang et al. |
| 7,278,582 | B1 | 10/2007 | Siegel et al. |
| 7,310,319 | B2 | 12/2007 | Awsienko et al. |
| 7,325,050 | B2 | 1/2008 | O'Connor et al. |
| 7,337,333 | B2 | 2/2008 | O'Conner et al. |
| 7,340,777 | B1 | 3/2008 | Szor |
| 7,353,362 | B2 | 4/2008 | Georgiou et al. |
| 7,382,154 | B2 | 6/2008 | Ramos et al. |
| 7,386,888 | B2 | 6/2008 | Liang et al. |
| 7,418,534 | B2 | 8/2008 | Hayter et al. |
| 7,437,540 | B2 | 10/2008 | Paolucci et al. |
| 7,447,147 | B2 | 11/2008 | Nguyen et al. |
| 7,447,197 | B2 | 11/2008 | Terrell et al. |
| 7,466,712 | B2 | 12/2008 | Makishima et al. |
| 7,467,306 | B2 | 12/2008 | Cartes et al. |
| 7,467,358 | B2 | 12/2008 | Kang et al. |
| 7,502,884 | B1 | 3/2009 | Shah et al. |
| 7,519,843 | B1 | 4/2009 | Buterbaugh et al. |
| 7,555,666 | B2 | 6/2009 | Brundridge et al. |
| 7,583,661 | B2 | 9/2009 | Chaudhuri |
| 7,586,841 | B2 | 9/2009 | Vasseur |
| 7,596,144 | B2 | 9/2009 | Pong |
| 7,599,360 | B2 | 10/2009 | Edsall et al. |
| 7,606,225 | B2 | 10/2009 | Xie et al. |
| 7,606,245 | B2 | 10/2009 | Ma et al. |
| 7,616,646 | B1 | 11/2009 | Ma et al. |
| 7,620,057 | B1 | 11/2009 | Aloni et al. |
| 7,657,677 | B2 | 2/2010 | Huang et al. |
| 7,657,756 | B2 | 2/2010 | Hall |
| 7,660,922 | B2 | 2/2010 | Harriman |
| 7,664,110 | B1 | 2/2010 | Lovett et al. |
| 7,673,164 | B1 | 3/2010 | Agarwal |
| 7,710,936 | B2 | 5/2010 | Morales Barroso |
| 7,719,834 | B2 | 5/2010 | Miyamoto et al. |
| 7,721,125 | B2 | 5/2010 | Fung |
| 7,751,433 | B2 | 7/2010 | Dollo et al. |
| 7,760,720 | B2 | 7/2010 | Pullela et al. |
| 7,761,687 | B2 | 7/2010 | Blumrich et al. |
| 7,783,910 | B2 | 8/2010 | Felter et al. |
| 7,791,894 | B2 | 9/2010 | Bechtolsheim |
| 7,792,113 | B1 | 9/2010 | Foschiano et al. |
| 7,796,399 | B2 | 9/2010 | Clayton et al. |
| 7,801,132 | B2 | 9/2010 | Ofek et al. |
| 7,802,017 | B2 | 9/2010 | Uemura et al. |
| 7,805,575 | B1* | 9/2010 | Agarwal ............ G06F 12/0811 711/141 |
| 7,831,839 | B2 | 11/2010 | Hatakeyama |
| 7,840,703 | B2 | 11/2010 | Arimilli et al. |
| 7,865,614 | B2 | 1/2011 | Lu et al. |
| 7,925,795 | B2 | 4/2011 | Tamir et al. |
| 7,934,005 | B2 | 4/2011 | Fascenda |
| 7,970,929 | B1 | 6/2011 | Mahalingaiah |
| 7,975,110 | B1 | 7/2011 | Spaur et al. |
| 7,991,817 | B2 | 8/2011 | Dehon et al. |
| 7,991,922 | B2 | 8/2011 | Hayter et al. |
| 7,992,151 | B2 | 8/2011 | Warrier et al. |
| 8,019,832 | B2 | 9/2011 | De Sousa et al. |
| 8,060,760 | B2 | 11/2011 | Shetty et al. |
| 8,060,775 | B1 | 11/2011 | Sharma et al. |
| 8,082,400 | B1 | 12/2011 | Chang et al. |
| 8,108,508 | B1 | 1/2012 | Goh et al. |
| 8,122,269 | B2 | 2/2012 | Houlihan et al. |
| 8,132,034 | B2 | 3/2012 | Lambert et al. |
| 8,155,113 | B1 | 4/2012 | Agarwal |
| 8,156,362 | B2 | 4/2012 | Branover et al. |
| 8,165,120 | B2 | 4/2012 | Maruccia et al. |
| 8,170,040 | B2 | 5/2012 | Konda |
| 8,180,996 | B2 | 5/2012 | Fullerton et al. |
| 8,189,612 | B2 | 5/2012 | Lemaire et al. |
| 8,199,636 | B1 | 6/2012 | Rouyer et al. |
| 8,205,103 | B2 | 6/2012 | Kazama et al. |
| 8,379,425 | B2 | 2/2013 | Fukuoka et al. |
| 8,397,092 | B2 | 3/2013 | Karnowski |
| 8,407,428 | B2 | 3/2013 | Cheriton et al. |
| 8,504,791 | B2 | 8/2013 | Cheriton et al. |
| 8,599,863 | B2 | 12/2013 | Davis |
| 8,684,802 | B1 | 4/2014 | Gross et al. |
| 8,738,860 | B1 | 5/2014 | Griffin et al. |
| 8,745,275 | B2 | 6/2014 | Ikeya et al. |
| 8,745,302 | B2 | 6/2014 | Davis et al. |
| 8,782,321 | B2 | 7/2014 | Harriman et al. |
| 8,812,400 | B2 | 8/2014 | Faraboschi et al. |
| 8,824,485 | B2 | 9/2014 | Biswas et al. |
| 8,854,831 | B2 | 10/2014 | Arnouse |
| 9,008,079 | B2 | 4/2015 | Davis et al. |
| 2002/0004912 | A1 | 1/2002 | Fung |
| 2002/0040391 | A1 | 4/2002 | Chaiken et al. |
| 2002/0083352 | A1 | 6/2002 | Fujimoto et al. |
| 2002/0097732 | A1 | 7/2002 | Worster et al. |

(56) References Cited

U.S. PATENT DOCUMENTS

| | | |
|---|---|---|
| 2002/0107903 A1 | 8/2002 | Richter et al. |
| 2002/0124128 A1 | 9/2002 | Qiu |
| 2002/0159452 A1 | 10/2002 | Foster et al. |
| 2002/0172205 A1 | 11/2002 | Tagore-Brage et al. |
| 2002/0186656 A1 | 12/2002 | Vu |
| 2002/0194412 A1 | 12/2002 | Bottom |
| 2003/0007493 A1 | 1/2003 | Oi et al. |
| 2003/0033547 A1 | 2/2003 | Larson et al. |
| 2003/0041266 A1 | 2/2003 | Ke et al. |
| 2003/0076832 A1 | 4/2003 | Ni |
| 2003/0093255 A1 | 5/2003 | Freyensee et al. |
| 2003/0093624 A1 | 5/2003 | Arimilli et al. |
| 2003/0110262 A1 | 6/2003 | Hasan et al. |
| 2003/0140190 A1 | 7/2003 | Mahony et al. |
| 2003/0158940 A1 | 8/2003 | Leigh |
| 2003/0159083 A1 | 8/2003 | Fukuhara et al. |
| 2003/0172191 A1 | 9/2003 | Williams |
| 2003/0188083 A1 | 10/2003 | Kumar et al. |
| 2003/0193402 A1 | 10/2003 | Post et al. |
| 2003/0202520 A1 | 10/2003 | Witkowski et al. |
| 2003/0231624 A1 | 12/2003 | Alappat et al. |
| 2004/0013113 A1 | 1/2004 | Singh et al. |
| 2004/0017806 A1 | 1/2004 | Yazdy et al. |
| 2004/0017808 A1 | 1/2004 | Forbes et al. |
| 2004/0030938 A1 | 2/2004 | Barr et al. |
| 2004/0068676 A1 | 4/2004 | Larson et al. |
| 2004/0111612 A1 | 6/2004 | Choi et al. |
| 2004/0141521 A1 | 7/2004 | George |
| 2004/0165588 A1 | 8/2004 | Pandya |
| 2004/0210693 A1 | 10/2004 | Zeitler et al. |
| 2004/0215864 A1 | 10/2004 | Arimilli et al. |
| 2004/0215991 A1 | 10/2004 | McAfee et al. |
| 2004/0267486 A1 | 12/2004 | Percer et al. |
| 2005/0015378 A1 | 1/2005 | Gammel et al. |
| 2005/0018604 A1 | 1/2005 | Dropps et al. |
| 2005/0018606 A1 | 1/2005 | Dropps et al. |
| 2005/0018663 A1 | 1/2005 | Dropps et al. |
| 2005/0021606 A1 | 1/2005 | Davies et al. |
| 2005/0030954 A1 | 2/2005 | Dropps et al. |
| 2005/0033742 A1 | 2/2005 | Kamvar et al. |
| 2005/0033890 A1 | 2/2005 | Lee |
| 2005/0044195 A1 | 2/2005 | Westfall |
| 2005/0077921 A1 | 4/2005 | Percer et al. |
| 2005/0105538 A1 | 5/2005 | Perera et al. |
| 2005/0141424 A1 | 6/2005 | Lim et al. |
| 2005/0228852 A1 | 10/2005 | Santos et al. |
| 2005/0240688 A1 | 10/2005 | Moerman et al. |
| 2006/0002311 A1 | 1/2006 | Iwanaga et al. |
| 2006/0013218 A1 | 1/2006 | Shore et al. |
| 2006/0029053 A1 | 2/2006 | Roberts et al. |
| 2006/0090025 A1 | 4/2006 | Tufford et al. |
| 2006/0136570 A1 | 6/2006 | Pandya |
| 2006/0140211 A1 | 6/2006 | Huang et al. |
| 2006/0174342 A1 | 8/2006 | Zaheer et al. |
| 2006/0179241 A1 | 8/2006 | Clark et al. |
| 2006/0236371 A1 | 10/2006 | Fish |
| 2006/0248359 A1 | 11/2006 | Fung |
| 2006/0259734 A1 | 11/2006 | Sheu et al. |
| 2006/0265609 A1 | 11/2006 | Fung |
| 2007/0006001 A1 | 1/2007 | Isobe et al. |
| 2007/0076653 A1 | 4/2007 | Park et al. |
| 2007/0094486 A1 | 4/2007 | Moore et al. |
| 2007/0109968 A1 | 5/2007 | Hussain et al. |
| 2007/0130397 A1 | 6/2007 | Tsu |
| 2007/0180310 A1 | 8/2007 | Johnson et al. |
| 2007/0209072 A1 | 9/2007 | Chen |
| 2007/0226795 A1 | 9/2007 | Conti et al. |
| 2007/0280230 A1 | 12/2007 | Park |
| 2007/0286009 A1 | 12/2007 | Norman |
| 2007/0288585 A1 | 12/2007 | Sekiguchi et al. |
| 2008/0013453 A1 | 1/2008 | Chiang et al. |
| 2008/0040463 A1 | 2/2008 | Brown et al. |
| 2008/0052437 A1 | 2/2008 | Loffink et al. |
| 2008/0059782 A1 | 3/2008 | Kruse et al. |
| 2008/0075089 A1 | 3/2008 | Evans et al. |
| 2008/0089358 A1 | 4/2008 | Basso et al. |
| 2008/0104264 A1 | 5/2008 | Duerk et al. |
| 2008/0140771 A1 | 6/2008 | Vass et al. |
| 2008/0140930 A1 | 6/2008 | Hotchkiss |
| 2008/0159745 A1 | 7/2008 | Segal |
| 2008/0162691 A1 | 7/2008 | Zhang et al. |
| 2008/0183882 A1 | 7/2008 | Flynn et al. |
| 2008/0186965 A1 | 8/2008 | Zheng et al. |
| 2008/0199133 A1 | 8/2008 | Takizawa et al. |
| 2008/0212273 A1 | 9/2008 | Bechtolsheim |
| 2008/0212276 A1 | 9/2008 | Bottom et al. |
| 2008/0217021 A1 | 9/2008 | Lembcke et al. |
| 2008/0222434 A1 | 9/2008 | Shimizu et al. |
| 2008/0235443 A1 | 9/2008 | Chow et al. |
| 2008/0243634 A1 | 10/2008 | Dworkin et al. |
| 2008/0250181 A1 | 10/2008 | Li et al. |
| 2008/0259555 A1 | 10/2008 | Bechtolsheim et al. |
| 2008/0259788 A1 | 10/2008 | Wang et al. |
| 2008/0266793 A1 | 10/2008 | Lee |
| 2008/0270599 A1 | 10/2008 | Tamir et al. |
| 2008/0288660 A1 | 11/2008 | Balasubramanian et al. |
| 2008/0288664 A1 | 11/2008 | Pettey et al. |
| 2008/0288683 A1 | 11/2008 | Ramey |
| 2008/0301794 A1 | 12/2008 | Lee |
| 2008/0313369 A1 | 12/2008 | Verdoorn et al. |
| 2008/0320161 A1 | 12/2008 | Maruccia et al. |
| 2009/0021907 A1 | 1/2009 | Mann et al. |
| 2009/0044036 A1 | 2/2009 | Merkin |
| 2009/0063443 A1 | 3/2009 | Arimilli et al. |
| 2009/0064287 A1 | 3/2009 | Bagepalli et al. |
| 2009/0080428 A1 | 3/2009 | Witkowski et al. |
| 2009/0097200 A1 | 4/2009 | Sharma et al. |
| 2009/0113130 A1 | 4/2009 | He et al. |
| 2009/0133129 A1 | 5/2009 | Jeong et al. |
| 2009/0135751 A1* | 5/2009 | Hodges ................ G06F 1/3209 370/311 |
| 2009/0135835 A1 | 5/2009 | Gallatin et al. |
| 2009/0158070 A1 | 6/2009 | Gruendler |
| 2009/0172423 A1 | 7/2009 | Song et al. |
| 2009/0198958 A1 | 8/2009 | Arimilli et al. |
| 2009/0204834 A1 | 8/2009 | Hendin et al. |
| 2009/0204837 A1 | 8/2009 | Raval et al. |
| 2009/0219827 A1 | 9/2009 | Chen et al. |
| 2009/0222884 A1 | 9/2009 | Shaji et al. |
| 2009/0225751 A1 | 9/2009 | Koenck et al. |
| 2009/0235104 A1 | 9/2009 | Fung |
| 2009/0248943 A1 | 10/2009 | Jiang et al. |
| 2009/0259863 A1 | 10/2009 | Williams et al. |
| 2009/0259864 A1 | 10/2009 | Li et al. |
| 2009/0265045 A1 | 10/2009 | Coxe, III |
| 2009/0271656 A1 | 10/2009 | Yokota et al. |
| 2009/0276666 A1 | 11/2009 | Haley et al. |
| 2009/0279518 A1 | 11/2009 | Falk et al. |
| 2009/0282274 A1 | 11/2009 | Langgood et al. |
| 2009/0282419 A1 | 11/2009 | Mejdrich et al. |
| 2009/0313390 A1 | 12/2009 | Ahuja et al. |
| 2010/0005331 A1 | 1/2010 | Somasundaram et al. |
| 2010/0008038 A1 | 1/2010 | Coglitore |
| 2010/0008365 A1 | 1/2010 | Porat |
| 2010/0026408 A1 | 2/2010 | Shau |
| 2010/0040053 A1 | 2/2010 | Gottumukkula et al. |
| 2010/0049822 A1 | 2/2010 | Davies et al. |
| 2010/0051391 A1 | 3/2010 | Jahkonen |
| 2010/0106987 A1 | 4/2010 | Lambert et al. |
| 2010/0118880 A1 | 5/2010 | Kunz et al. |
| 2010/0125742 A1* | 5/2010 | Ohtani .......................... 713/310 |
| 2010/0125915 A1 | 5/2010 | Hall et al. |
| 2010/0138481 A1* | 6/2010 | Behrens ...................... 709/203 |
| 2010/0158005 A1 | 6/2010 | Mukhopadhyay et al. |
| 2010/0161909 A1 | 6/2010 | Nation et al. |
| 2010/0165983 A1 | 7/2010 | Aybay et al. |
| 2010/0169479 A1 | 7/2010 | Jeong et al. |
| 2010/0218194 A1 | 8/2010 | Dallman et al. |
| 2010/0220732 A1 | 9/2010 | Hussain et al. |
| 2010/0250914 A1 | 9/2010 | Abdul et al. |
| 2010/0265650 A1 | 10/2010 | Chen et al. |
| 2010/0281246 A1 | 11/2010 | Bristow et al. |
| 2010/0299548 A1 | 11/2010 | Chadirchi et al. |
| 2010/0308897 A1 | 12/2010 | Evoy et al. |

(56) References Cited

U.S. PATENT DOCUMENTS

| | | |
|---|---|---|
| 2010/0312910 A1 | 12/2010 | Lin et al. |
| 2010/0312969 A1 | 12/2010 | Yamazaki et al. |
| 2010/0318812 A1 | 12/2010 | Auradkar et al. |
| 2011/0023104 A1 | 1/2011 | Franklin |
| 2011/0026397 A1 | 2/2011 | Saltsidis et al. |
| 2011/0029652 A1 | 2/2011 | Chhuor et al. |
| 2011/0058573 A1 | 3/2011 | Balakavi et al. |
| 2011/0075369 A1 | 3/2011 | Sun et al. |
| 2011/0090633 A1 | 4/2011 | Rabinovitz |
| 2011/0103391 A1 | 5/2011 | Davis et al. |
| 2011/0119344 A1 | 5/2011 | Eustis |
| 2011/0123014 A1 | 5/2011 | Smith |
| 2011/0138046 A1 | 6/2011 | Bonnier et al. |
| 2011/0185370 A1 | 7/2011 | Tamir et al. |
| 2011/0191514 A1 | 8/2011 | Wu et al. |
| 2011/0191610 A1* | 8/2011 | Agarwal ............... G06F 1/3203 713/310 |
| 2011/0197012 A1 | 8/2011 | Liao et al. |
| 2011/0210975 A1 | 9/2011 | Wong et al. |
| 2011/0239014 A1 | 9/2011 | Karnowski |
| 2011/0271159 A1 | 11/2011 | Ahn et al. |
| 2011/0273840 A1 | 11/2011 | Chen |
| 2011/0295991 A1 | 12/2011 | Aida |
| 2011/0296141 A1 | 12/2011 | Daffron |
| 2011/0320690 A1 | 12/2011 | Petersen et al. |
| 2012/0011500 A1 | 1/2012 | Faraboschi et al. |
| 2012/0020207 A1 | 1/2012 | Corti et al. |
| 2012/0050981 A1 | 3/2012 | Xu et al. |
| 2012/0054469 A1 | 3/2012 | Ikeya et al. |
| 2012/0054511 A1 | 3/2012 | Brinks et al. |
| 2012/0081850 A1 | 4/2012 | Regimbal et al. |
| 2012/0096211 A1 | 4/2012 | Davis et al. |
| 2012/0099265 A1 | 4/2012 | Reber |
| 2012/0131201 A1 | 5/2012 | Matthews et al. |
| 2012/0155168 A1 | 6/2012 | Kim et al. |
| 2012/0198252 A1 | 8/2012 | Kirschtein et al. |
| 2012/0207165 A1 | 8/2012 | Davis |
| 2012/0297042 A1 | 11/2012 | Davis et al. |
| 2013/0010639 A1 | 1/2013 | Armstrong et al. |
| 2013/0024645 A1 | 1/2013 | Cheriton et al. |
| 2013/0031331 A1 | 1/2013 | Cheriton et al. |
| 2013/0094499 A1 | 4/2013 | Davis et al. |
| 2013/0097448 A1 | 4/2013 | Davis et al. |
| 2013/0148667 A1 | 6/2013 | Hama et al. |
| 2013/0163605 A1 | 6/2013 | Chandra et al. |
| 2013/0290643 A1 | 10/2013 | Lim et al. |
| 2013/0290650 A1 | 10/2013 | Chang et al. |
| 2013/0318269 A1 | 11/2013 | Dalal et al. |
| 2014/0122833 A1 | 5/2014 | Davis et al. |
| 2014/0359044 A1 | 12/2014 | Davis et al. |
| 2014/0365596 A1 | 12/2014 | Kanevsky et al. |
| 2015/0039840 A1 | 2/2015 | Chandra et al. |
| 2015/0103826 A1 | 4/2015 | Davis |

FOREIGN PATENT DOCUMENTS

| | | |
|---|---|---|
| WO | WO-2004/021641 | 3/2004 |
| WO | WO-2005/013143 | 2/2005 |
| WO | WO-2008/000193 | 1/2008 |
| WO | WO-2011/044271 | 4/2011 |
| WO | WO-2012/037494 | 3/2012 |

OTHER PUBLICATIONS

PCT/US2010/053227—Written Opinion dated Dec. 16, 2010 (8 pages).
PCT/US2012/038987—International Search Report Aug. 16, 2012 (2 pages).
PCT/US2012/038987—Written Opinion dated Aug. 16, 2012 (7 pages).
Final Office Action on U.S. Appl. No. 13/527,505, mailed Dec. 5, 2014.
Notice of Allowance on U.S. Appl. No. 13/705,340, mailed Dec. 3, 2014.
Final Office Action on U.S. Appl. No. 13/527,498, mailed Nov. 17, 2014.
Non-Final Office Action on U.S. Appl. No. 13/662,759, mailed Nov. 6, 2014.
Final Office Action on U.S. Appl. No. 13/475,713, mailed Oct. 17, 2014.
Final Office Action on U.S. Appl. No. 13/475,722, mailed Oct. 20, 2014.
Non-Final Office Action on U.S. Appl. No. 12/889,721, mailed Sep. 29, 2014.
Non-Final Office Action on U.S. Appl. No. 13/234,054, mailed Oct. 23, 2014.
Advanced Switching Technology Tech Brief, published 2005, 2 pages.
Chapter 1 Overview of the Origin Family Architecture from Origin and Onyx2 Theory of Operations Manual, published 1997, 18 pages.
Cisco MDS 9000 Family Multiprotocol Services Module, published 2006, 13 pages.
Comparing the I2C Bus to the SMBUS, Maxim Integrated, Dec. 1, 2000, p. 1.
Deering, "IP Multicast Extensions for 4.3BSD UNIX and related Systems," Jun. 1999, 5 pages.
Extended European Search Report for EP 10827330.1, mailed Jun. 5, 2013.
Final Office Action on U.S. Appl. No. 12/889,721, mailed Apr. 17, 2014.
Final Office Action on U.S. Appl. No. 12/794,996, mailed Jun. 19, 2013.
Final Office Action on U.S. Appl. No. 13/624,725, mailed Nov. 13, 2013.
Final Office Action on U.S. Appl. No. 13/624,731, mailed Jul. 25, 2014.
Final Office Action on U.S. Appl. No. 13/705,340, mailed Aug. 2, 2013.
Final Office Action on U.S. Appl. No. 13/705,414, mailed Aug. 9, 2013.
Final Office Action on U.S. Appl. No. 13/624,731, mailed Nov. 12, 2013.
fpga4fun.com,"What is JTAG?", 2 pages, Jan. 31, 2010.
From AT to BTX: Motherboard Form Factor, Webopedia, Apr. 29, 2005, p. 1.
HP Virtual Connect Traffic Flow—Technology brief, Jan. 2012, 22 pages.
International Preliminary Report on Patentability for PCT/US2009/044200, mailed Nov. 17, 2010.
International Preliminary Report on Patentability for PCT/US2012/038986 issued on Nov. 26, 2013.
International Preliminary Report on Patentability for PCT/US2012/061747, mailed Apr. 29, 2014.
International Preliminary Report on Patentability issued on PCT/US12/62608, issued May 6, 2014.
International Search Report and Written Opinion for PCT/US12/61747, mailed Mar. 1, 2013.
International Search Report and Written Opinion for PCT/US12/62608, mailed Jan. 18, 2013.
International Search Report and Written Opinion for PCT/US2011/051996, mailed Jan. 19, 2012.
International Search Report and Written Opinion on PCT/US09/44200, mailed Jul. 1, 2009.
International Search Report and Written Opinion on PCT/US2012/038986, mailed Mar. 14, 2013.
Jansen et al., "SATA-IO to Develop Specification for Mini Interface Connector" Press Release Sep. 21, 2009, Serial ATA3 pages.
Nawathe et al., "Implementation of an 8-Core, 64-Thread, Power Efficient SPARC Server on a Chip", IEEE Journal of Solid-State Circuits, vol. 43, No. 1, Jan. 2008, pp. 6-20.
Non-Final Action on U.S. Appl. No. 13/728,362, mailed Feb. 21, 2014.
Non-Final Office Action on U.S. Appl. No. 12/889,721, mailed Jul. 2, 2013.
Non-Final Office Action on U.S. Appl. No. 13/475,722, mailed Jan. 17, 2014.

(56) References Cited

OTHER PUBLICATIONS

Non-Final Office Action on U.S. Appl. No. 12/794,996, mailed Sep. 17, 2012.
Non-Final Office Action on U.S. Appl. No. 12/889,721, mailed Oct. 11, 2012.
Non-Final Office Action on U.S. Appl. No. 13/284,855, mailed Dec. 19, 2013.
Non-Final Office Action on U.S. Appl. No. 13/453,086, mailed Mar. 12, 2013.
Non-Final Office Action on U.S. Appl. No. 13/475,713, mailed Apr. 1, 2014.
Non-Final Office Action on U.S. Appl. No. 13/527,505, mailed May 8, 2014.
Non-Final Office Action on U.S. Appl. No. 13/527,498, Mailed May 8, 2014.
Non-Final Office Action on U.S. Appl. No. 13/624,725, mailed Jan. 10, 2013.
Non-final office action on U.S. Appl. No. 13/624,731 mailed Jan. 29, 2013.
Non-Final Office Action on U.S. Appl. No. 13/705,286, mailed May 13, 2013.
Non-Final Office Action on U.S. Appl. No. 13/705,340, mailed Mar. 12, 2014.
Non-Final Office Action on U.S. Appl. No. 13/705,340, mailed Mar. 29, 2013.
Non-Final Office Action on U.S. Appl. No. 13/705,414, mailed Apr. 9, 2013.
Non-Final Office Action on U.S. Appl. No. 13/705,428, mailed Jul. 10, 2013.
Notice of Allowance on U.S. Appl. No. 13/453,086, mailed Jul. 18, 2013.
Notice of Allowance on U.S. Appl. No. 13/705,386, mailed Jan. 24, 2014.
Notice of Allowance on U.S. Appl. No. 13/705,414, mailed Nov. 4, 2013.
Notice of Allowance on U.S. Appl. No. 13/284,855, mailed Jul. 14, 2014.
Venaas, "IPv4 Multicast Address Space Registry," 2013, http://www.iana.org/assignments/multicast-addresses/multicast-addresses.xhtml.
Elghany et al., "High Throuphput High Performance NoC Switch," NORCHIP 2008, Nov. 2008, pp. 237-240.
Grecu et al., "A Scalable Communication-Centric SoC Interconnect Architecture" Proceedings 5th International Symposium on Quality Electronic Design, 2005, pp. 343, 348 (full article included).
Hossain et al., "Extended Butterfly Fat Tree Interconnection (EFTI) Architecture for Network on Chip," 2005 IEEE Pacific Rim Conference on Communications, Computers and Signal Processing, Aug. 2005, pp. 613-616.
Non-Final Office Action on U.S. Appl. No. 14/334,931, mailed Jan. 5, 2015.
Pande et al., "Design of a Switch for Network on Chip Applications," May 25-28, 2003 Proceedings of the 2003 International Symposium on Circuits and Systems, vol. 5, pp. V217-V220.
Notice of Allowance on U.S. Appl. No. 13/475,722, mailed Feb. 27, 2015.
Notice of Allowance on U.S. Appl. No. 13/527,498, mailed Feb. 23, 2015.
Notice of Allowance on U.S. Appl. No. 13/527,505, mailed Mar. 6, 2015.
Notice of Allowance on U.S. Appl. No. 13/624,731, mailed Mar. 5, 2015.
Final Office Action on U.S. Appl. No. 13/234,054, mailed Apr. 16, 2015.
Non-Final Office Action on U.S. Appl. No. 13/624,725, mailed May 1, 2015.
Non-Final Office Action on U.S. Appl. No. 14/052,723, mailed May 1, 2015.
Non-Final Office Action on U.S. Appl. No. 13/728,308, mailed May 14, 2015.
Final Office Action on U.S. Appl. No. 14/106,698, mailed Aug. 19, 2015.
Final Office Action on U.S. Appl. No. 14/334,178, mailed Nov. 4, 2015.
Non-Final Office Action on U.S. Appl. No. 14/106,697, mailed Aug. 17, 2015.
Notice of Allowance U.S. Appl. No. 13/728,308, mailed Oct. 7, 2015.
Final Office Action on U.S. Appl. No. 12/889,721, mailed May 22, 2015.
Non-Final Office Action on U.S. Appl. No. 13/728,428, mailed Jun. 12, 2015.
Final Office Action on U.S. Appl. No. 14/334,931, mailed Jul. 9, 2015.
Non-Final Office Action on U.S. Appl. No. 13/234,054, mailed Aug. 6, 2015.
Non-Final Office Action on U.S. Appl. No. 14/106,698, mailed Feb. 12, 2015.
Notice of Allowance on U.S. Appl. No. 13/475,713, mailed Feb. 5, 2015.
Communication on EP Application 10827330.1, mailed Feb. 12, 2015.
Final Office Action on U.S. Appl. No. 14/052,723, mailed Dec. 3, 2015.
Non-Final Office Action on U.S. Appl. 14/334,931 Mailed Dec. 11, 2015.
Non-Final Office Action on U.S. Appl. No. 14/334,178 mailed Dec. 18, 2015.
Final Office Action on U.S. Appl. 13/234,054, mailed Jan. 26, 2016.
Final Office Action on U.S. Appl. No. 14/106,697 mailed Feb. 2, 2016.
Final Office Action on U.S. Appl. No. 13/662759, mailed Feb. 22, 2016.
Non-Final Office Action on U.S. Appl. No. 12/889721, mailed Feb. 24, 2016.

\* cited by examiner

NETWORK PROXY FOR HIGH-PERFORMANCE, LOW-POWER DATA CENTER INTERCONNECT FABRIC

PRIORITY CLAIMS/RELATED APPLICATIONS

This patent application is a continuation in part of and claims priority under 35 USC 120 and 121 to U.S. patent application Ser. No. 12/794,996 filed on Jun. 7, 2010 which in turn claims the benefit under 35 USC 119(e) to U.S. Provisional Patent Application Ser. No. 61/256,723 filed on Oct. 30, 2009 and entitled "System and Method for Enhanced Communications in a Multi-Processor System of a Chip (SOC), which are both incorporated herein by reference.

FIELD

The disclosure relates generally to a switching fabric for a computer-based system.

BACKGROUND

With the continued growth of the internet, web-based companies and systems and the proliferation of computers, there are numerous data centers that house multiple server computers in a location that is temperature controlled and can be externally managed as is well known.

FIGS. 1A and 1B show a classic data center network aggregation as is currently well known. FIG. 1A shows a diagrammatical view of a typical network data center architecture 100 wherein top level switches 101a-n are at the tops of racks 102a-n filled with blade servers 107a-n interspersed with local routers 103a-f. Additional storage routers and core switches. 105a-b and additional rack units 108a-n contain additional servers 104 e-k and routers 106a-g FIG. 1b shows an exemplary physical view 110 of a system with peripheral servers 111a-bn arranged around edge router systems 112a-h, which are placed around centrally located core switching systems 113. Typically such an aggregation 110 has 1-Gb Ethernet from the rack servers to their top of rack switches, and often 10 Gb Ethernet ports to the edge and core routers.

However, what is needed is a system and method for packet switching functionality focused on network aggregation that reduces size and power requirements of typical systems while reducing cost all at the same time and it is to this end that the disclosure is directed.

DETAILED DESCRIPTION OF ONE OR MORE EMBODIMENTS

The disclosure is particularly applicable to a network aggregation system and method as illustrated and described below and it is in this context that the disclosure will be described. It will be appreciated, however, that the system and method has greater utility since the system and method can be implemented using other elements and architectures that are within the scope of the disclosure and the disclosure is not limited to the illustrative embodiments described below.

The system and method also supports a routing using a tree-like or graph topology that supports multiple links per node, where each link is designated as an Up, Down, or Lateral link, or both, within the topology. In addition, each node in the system may be a combination computational/switch node, or just a switch node, and input/output (I/O) can reside on any node as described below in more detail. The system may also provide a system with a segmented Ethernet Media Access Control (MAC) architecture which may have a method of re-purposing MAC IP addresses for inside MACs and outside MACs, and leveraging what would normally be the physical signaling for the MAC to feed into the switch. The system may also provide a method of non-spoofing communication, as well as a method of fault-resilient broadcasting, which may have a method of unicast misrouting for fault resilience. In the context of network security, a spoofing attack is a situation in which one person or program successfully masquerades as another by falsifying data and thereby gaining an illegitimate advantage.

The system may also provide a rigorous security between the management processors, such that management processors can "trust" one another. In the example system shown in FIG. 5A (which is described below in more detail), there is a management processor within each SoC (the M3 microcontroller, block 906, FIG. 5A). The software running on the management processor is trusted because a) the vendor (in this case Calxeda, Inc.) has developed and verified the code, b) non-vendor code is not allowed to run on the processor. Maintaining a Trust relationship between the management processors allow them to communicate commands (e.g. reboot another node) or request sensitive information from another node without worrying that a user could spoof the request and gain access to information or control of the system.

The system may also provide a network proxy that has an integrated microcontroller in an always-on power domain within a system on a chip (SOC) that can take over network proxying for the larger onboard processor, and which may apply to a subtree. The system also provide a multi-domaining technique that can dramatically expand the size of an addressable fabric with only trivial changes to the Routing Header and the routing table.

Figure 1A:
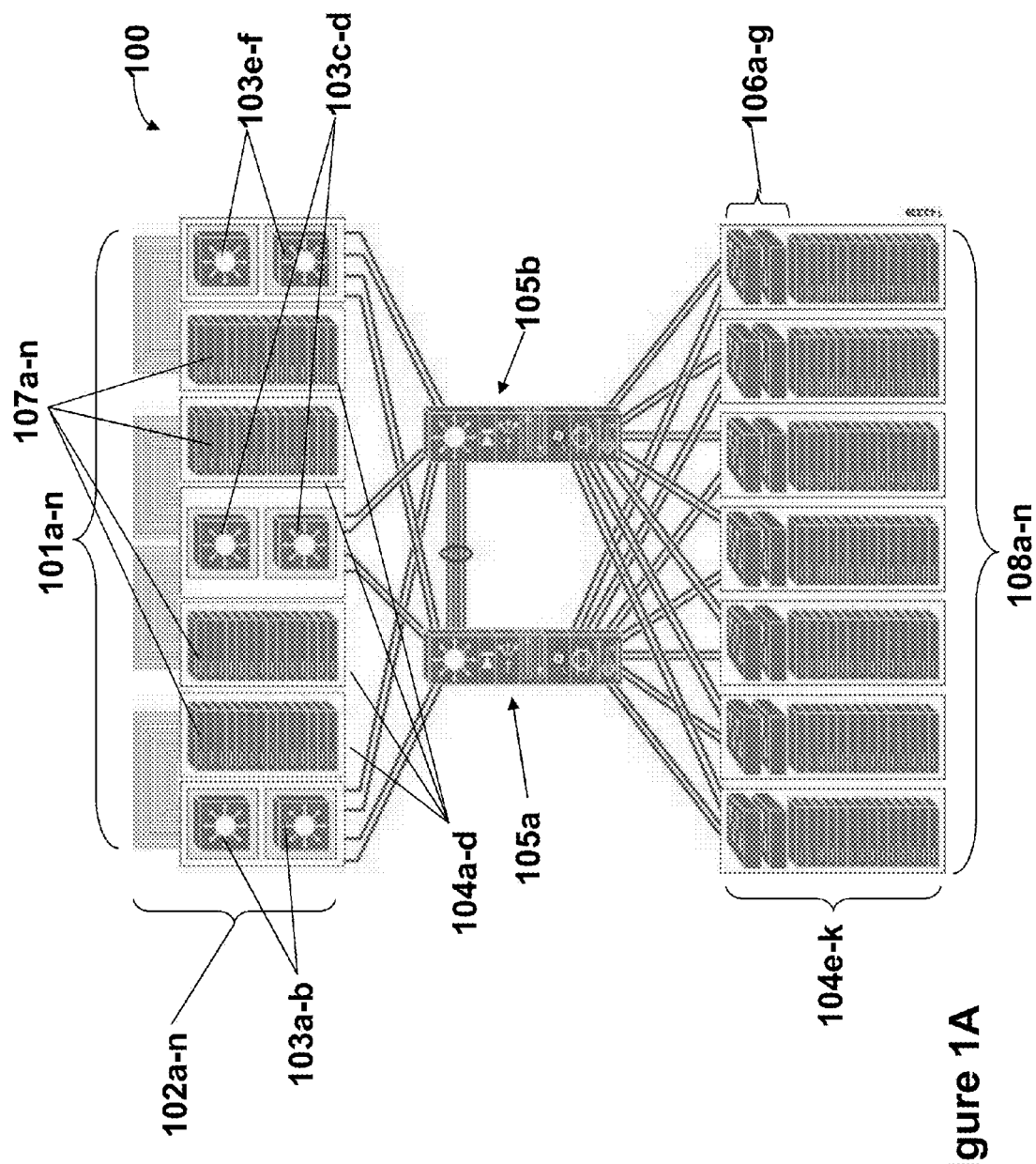
FIGS. 1A and 1B illustrate a typical data center system.
Figure 1B:
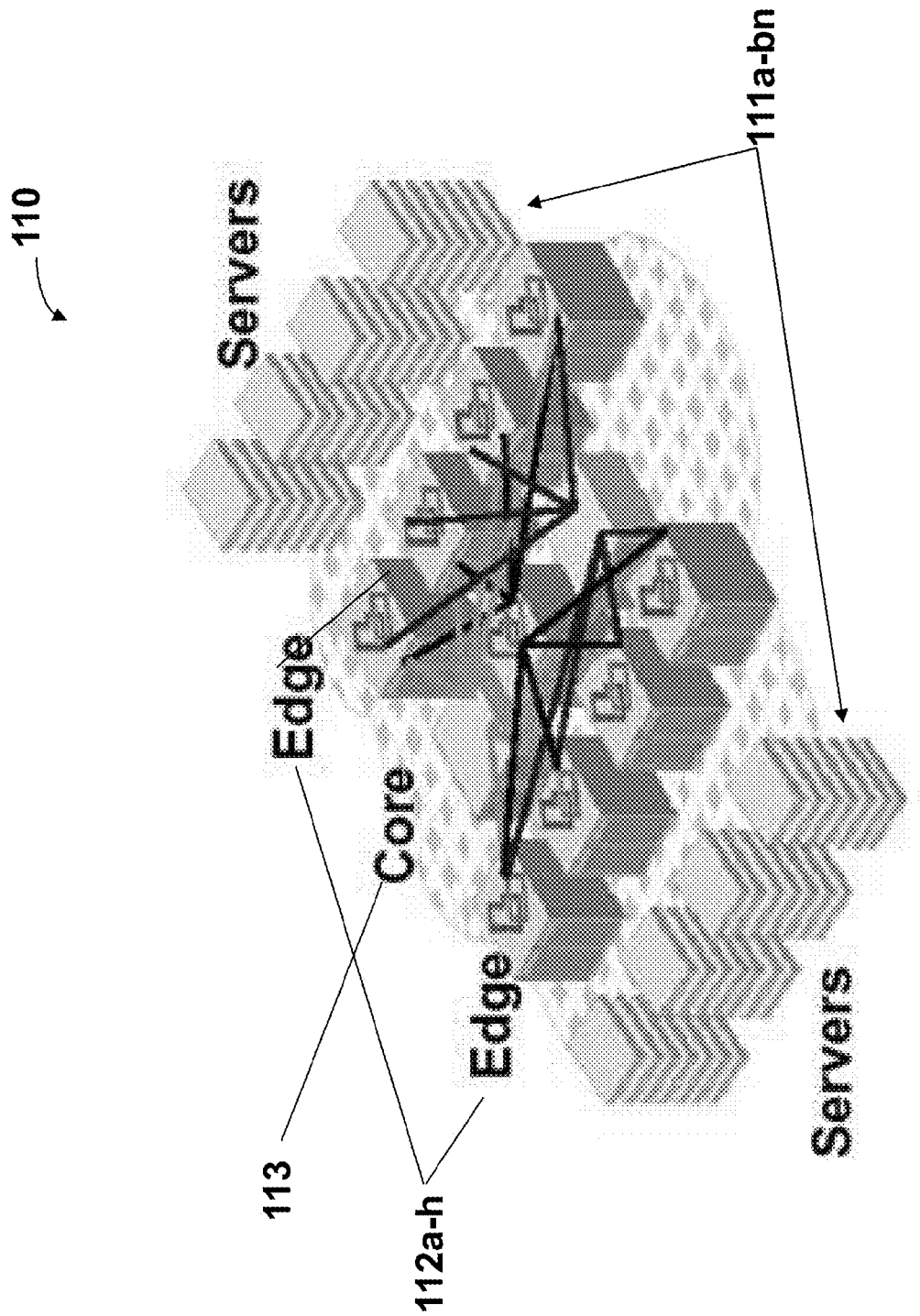
Figure 2:
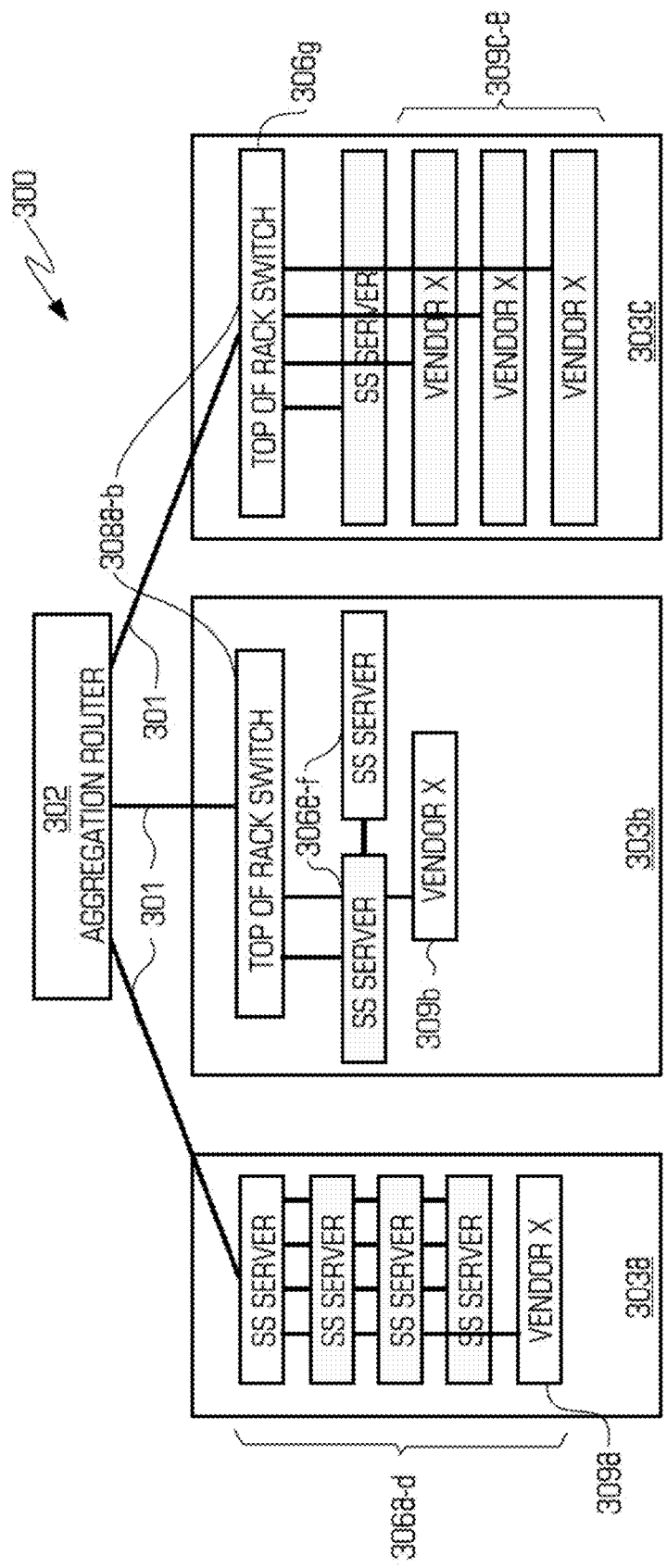
FIG. 2 is an overview of a network aggregation system.
Figure 3:
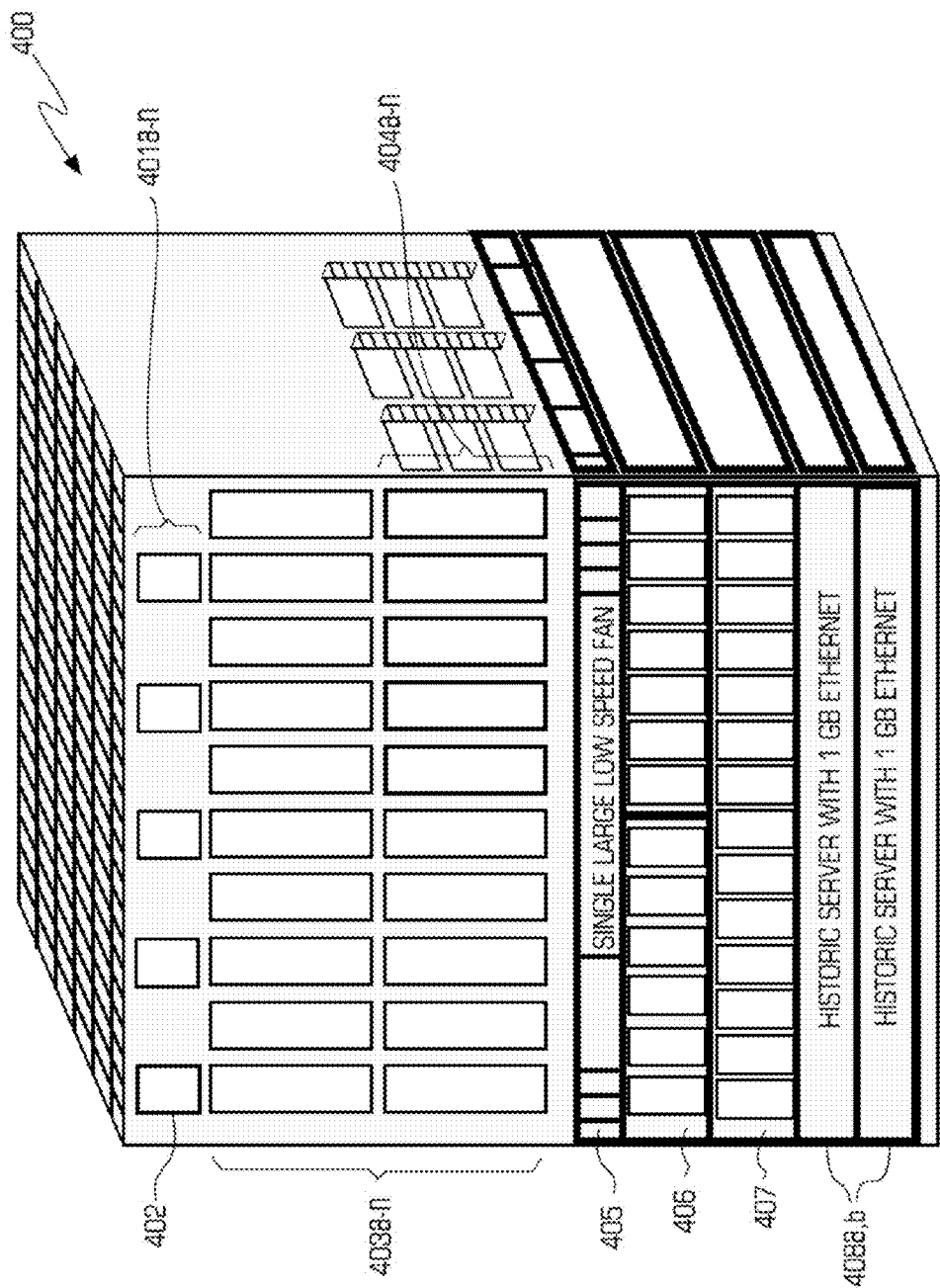
FIG. 3 illustrates an overview of an exemplary data center in a rack system.

FIG. 2 illustrates a network aggregation system 300. The network aggregation supports one or more high speed links 301 (thick lines), such as a 10-Gb/sec Ethernet communication, that connect an aggregation router 302 and one or more racks 303, such as three racks 303a-c as shown in FIG. 3. In a first rack 303a, the network aggregation system provides multiple high-speed 10 Gb paths, represented by thick lines, between one or more Calxeda computing unit 306a-d, such as server computers, on shelves within a rack. Further details of each Calxeda computing unit are described in more detail in U.S. Provisional Patent Application Ser. No. 61/256,723 filed on Oct. 30, 2009 and entitled "System and Method for Enhanced Communications in a Multi-Processor System of a Chip (SOC)" which is incorporated herein in its entirety by reference. An embedded switch 306a-d in the Calxeda computing units can replace a top-of-rack switch, thus saving a dramatic amount of power and cost, while still providing a 10 Gb Ethernet port to the aggregation router 302. The network aggregation system switching fabric can integrate traditional Ethernet (1 Gb or 10 Gb) into the XAUI fabric, and the Calxeda computing units can act as a top of rack switch for third-party Ethernet connected servers.

A middle rack 303*b* illustrates another configuration of a rack in the network aggregation system in which one or more Calxeda computing units 306*e, f* can integrate into existing data center racks that already contain a top-of-rack switch 308*a*. In this case, the IT group can continue to have their other computing units connected via 1 Gb Ethernet up to the existing top-of-rack switch and the internal Calxeda computing units can be interconnected via 10 Gb XAUI fabric and can connected up to the existing top-of-rack switch via either 1 Gb or 10 Gb Ethernet interconnects as shown in FIG. 2. A third rack 303*c* illustrates a current way that data center racks are traditionally deployed. The thin lines in the third rack 303*c* represent 1 Gb Ethernet. Thus, the current deployments of data center racks is traditionally 1 Gb Ethernet up to the top-of-rack switch 308*b*, and then 10 Gb (thick line 301) but from the top of rack switch to the aggregation router. Note that all servers are present in an unknown quantity, while they are pictured here in finite quantities for purposes of clarity and simplicity. Also, using the enhanced Calxeda servers, no additional routers are needed, as they operate their own XAUI switching fabric, discussed below.

FIG. 3 shows an overview of an exemplary "data center in a rack" 400 according to one embodiment of the system. The "data center in a rack" 400 may have 10-Gb Ethernet PHY 401*a*-*n* and 1-Gb private Ethernet PHY 402. Large computers (power servers) 403*a*-*n* support search; data mining; indexing; Apache Hadoop, a Java software framework; MapReduce, a software framework introduced by Google to support distributed computing on large data sets on clusters of computers; cloud applications; etc. Computers (servers) 404*a*-*n* with local flash and/or solid-state disk (SSD) support search, MySQL, CDN, software-as-a-service (SaaS), cloud applications, etc. A single, large, slow-speed fan 405 augments the convection cooling of the vertically mounted servers above it. Data center 400 has an array 406 of hard disks, e.g., in a Just a Bunch of Disks (JBOD) configuration, and, optionally, Calxeda computing units in a disk form factor (for example, the green boxes in arrays 406 and 407), optionally acting as disk controllers. Hard disk servers or Calxeda disk servers may be used for web servers, user applications, and cloud applications, etc. Also shown are an array 407 of storage servers and historic servers 408*a, b* (any size, any vendor) with standard Ethernet interfaces for legacy applications.

The data center in a rack 400 uses a proprietary system interconnect approach that dramatically reduces power and wires and enables heterogeneous systems, integrating existing Ethernet-based servers and enabling legacy applications. In one aspect, a complete server or storage server is put in a disk or SSD form factor, with 8-16 SATA interfaces with 4 ServerNodes™ and 8 PCIe x4 interfaces with 4 ServerNodes™. It supports disk and/or SSD+ServerNode™, using a proprietary board paired with a disk(s) and supporting Web server, user applications, cloud applications, disk caching, etc.

The Calxeda XAUI system interconnect reduces power, wires and the size of the rack. There is no need for high powered, expensive Ethernet switches and high-power Ethernet Phys on the individual servers. It dramatically reduces cables (cable complexity, costs, significant source of failures). It also enables a heterogeneous server mixture inside the rack, supporting any equipment that uses Ethernet or SATA or PCIe. It can be integrated into the system interconnect.

The herein presented aspects of a server-on-a-chip (SOC) with packet switch functionality are focused on network aggregation. The SOC is not a fully functionally equivalent to an industry-standard network switch, such as, for example, a Cisco switch or router. But for certain applications discussed throughout this document, it offers a better price/performance ratio as well as a power/performance ratio. It contains a layer 2 packet switch, with routing based on source/destination MAC addresses. It further supports virtual local area network (VLAN), with configurable VLAN filtering on domain incoming packets to minimize unnecessary traffic in a domain. The embedded MACs within the SOC do have complete VLAN support providing VLAN capability to the overall SOC without the embedded switch explicitly having VLAN support. It can also wake up the system by management processor notifying the management processor on link state transitions to reprogram routing configurations to route around faults. Such functionality does not require layer3 (or above) processing (i.e., it is not a router). It also does not offer complete VLAN support, support for QoS/CoS, address learning, filtering, spanning tree protocol (STP), etc.

Figure 4:
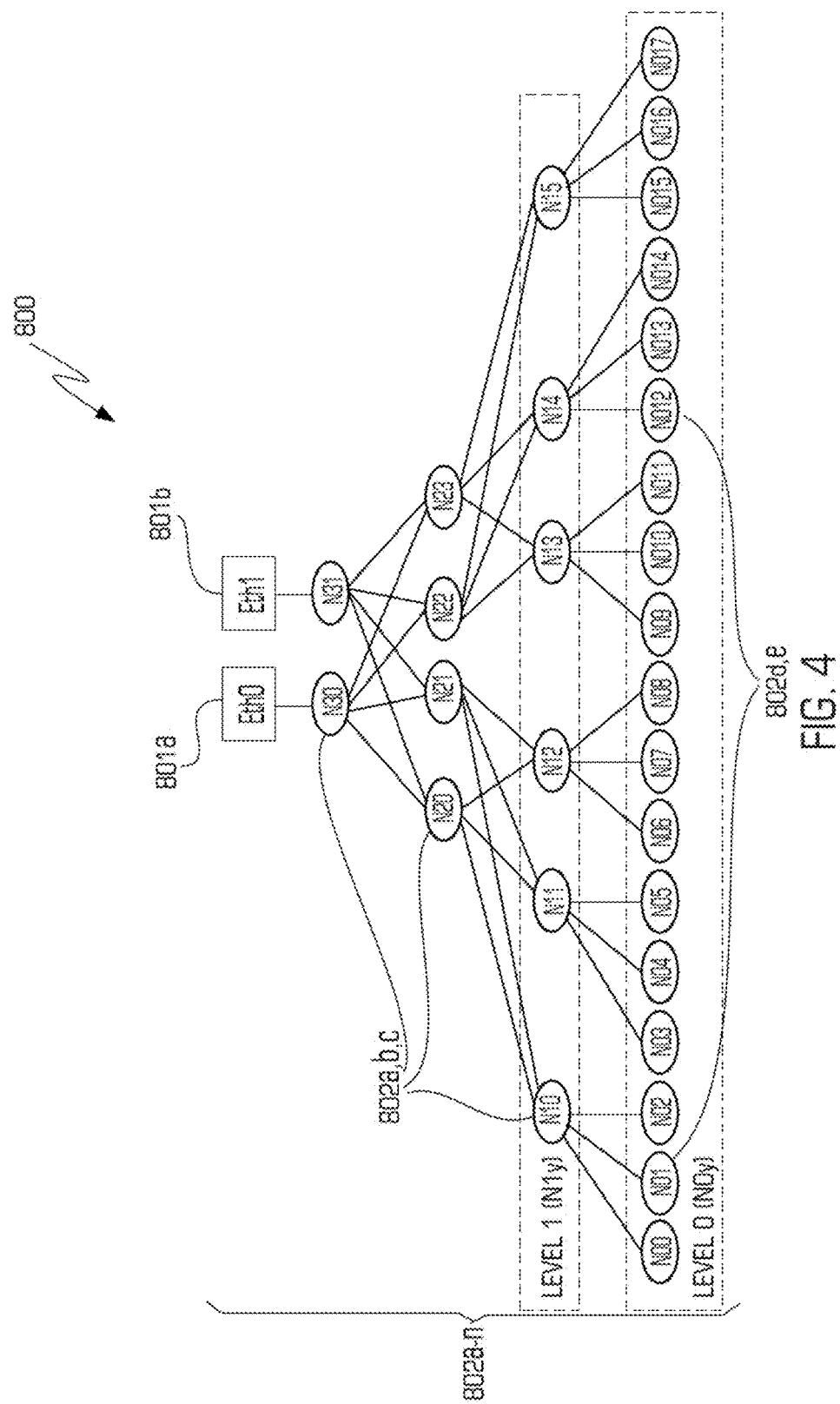
FIG. 4 illustrates a high-level topology of a network aggregating system.

FIG. 4 shows a high-level topology 800 of the network system that illustrates XAUI connected SoC nodes connected by the switching fabric. The 10 Gb Ethernet ports Eth0 801*a* and Eth1 801*b* come from the top of the tree. Ovals 802*a*-*n* are Calxeda nodes that comprise both computational processors as well as the embedded switch. The nodes have five XAUI links connected to the internal switch. The switching layers use all five XAUI links for switching. Level 0 leaf nodes 802*d, e* (i.e., N0n nodes, or Nxy, where x=level and y=item number) only use one XAUI link to attach to the interconnect, leaving four high-speed ports that can be used as XAUI, 10 Gb Ethernet, PCIe, SATA, etc., for attachment to I/O. The vast majority of trees and fat trees have active nodes only as leaf nodes, and the other nodes are pure switching nodes. This approach makes routing much more straightforward. Topology 800 has the flexibility to permit every node to be a combination computational and switch node, or just a switch node. Most tree-type implementations have I/O on the leaf nodes, but topology 800 let the I/O be on any node. In general, placing the Ethernet at the top of the tree minimizes the average number of hops to the Ethernet.

Figure 5A:
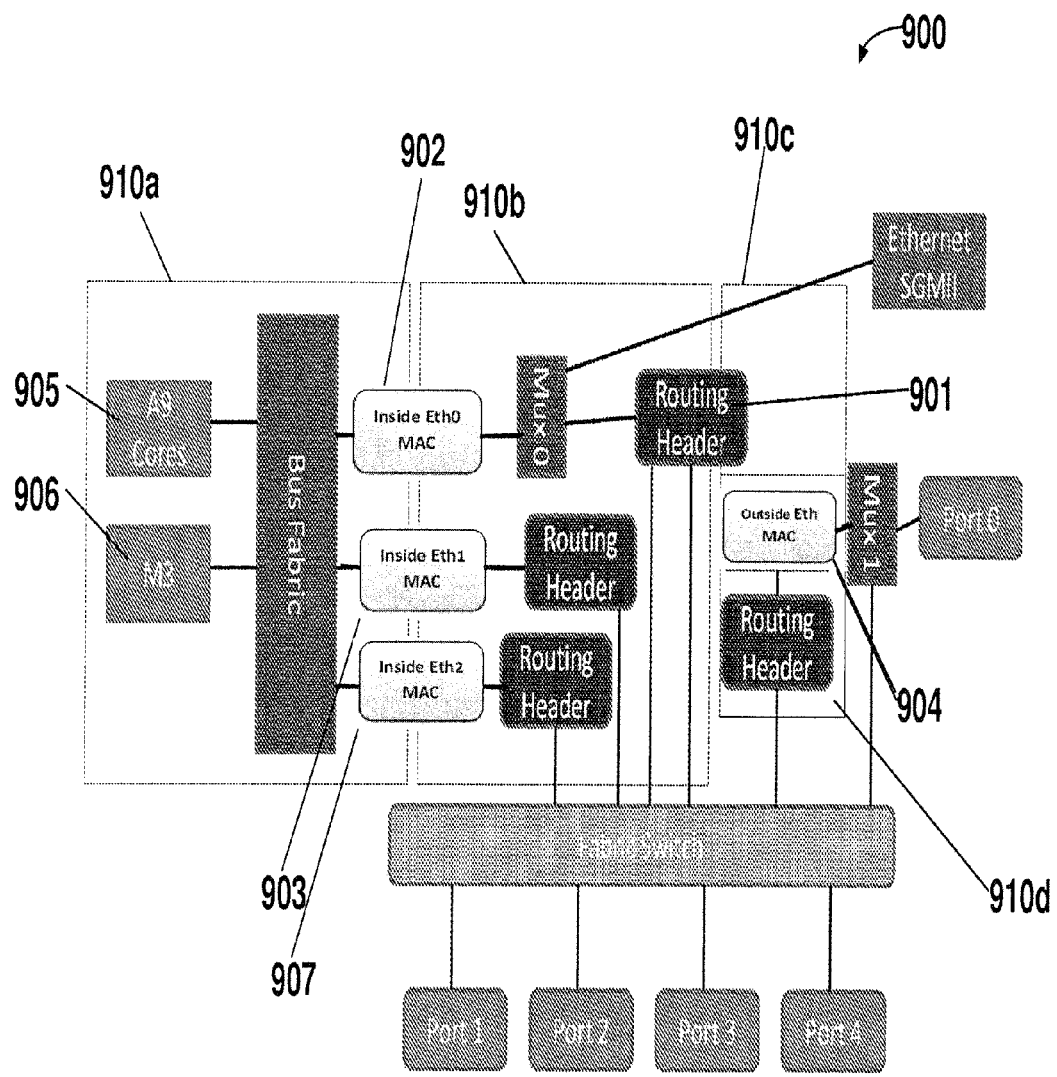
FIG. 5A illustrates a block diagram of an exemplary switch of the network aggregation system.

In more detail, the ovals shown in the tree-oriented topology in FIG. 4 represent independent nodes within a computing cluster. FIG. 5A illustrates one example implementation of an individual node of the cluster. When looking at a conventional implementation of a topology e.g. in FIG. 4, usually computing nodes are found in the lower level leaf nodes (e.g. N00-N08), and the upper level nodes don't have computing elements but are just network switching elements (N10-N21). With the node architecture shown in FIG. 5A, the A9 Cores (905) may be optionally enabled, or could be just left powered-off. So the upper level switching nodes (N10-N21) in FIG. 4 can be used as pure switching elements (like traditional implementations), or we can power on the A9 Cores module and use them as complete nodes within the computing cluster.

The switch architecture calls for a routing frame to be prepended to the Ethernet frame. The switch operates only against fields within the routing frame, and does not inspect the Ethernet frame directly. FIG. 5*a* shows a block diagram of an exemplary switch 900 according to one aspect of the system and method disclosed herein. It has four areas of interest 910*a*-*d*. Area 910*a* corresponds to Ethernet packets between the CPUs and the inside MACs. Area 910*b* corresponds to Ethernet frames at the Ethernet physical interface at the inside MACs, that contains the preamble, start of frame, and inter-frame gap fields. Area 910*c* corresponds to Ethernet frames at the Ethernet physical interface at the outside MAC, that contains the preamble, start of frame, and inter-frame gap fields. Area 910*d* corresponds to Ethernet packets between the processor of Routing Header 901 and outside MAC 904. This segmented MAC architecture is asymmetric. The inside MACs have the Ethernet physical signaling interface into the Routing Header processor, and the outside MAC has an Ethernet packet interface into the Routing Header processor. Thus the MAC IP is re-purposed for inside MACs and outside MACs, and what would normally be the physical signaling for the MAC to feed into the switch is leveraged. MAC configuration is such that the operating system device drivers of A9 cores 905 manage and control inside Eth0 MAC 902 and inside ETH1 MAC 903. The device driver of management processor 906 manages and controls Inside Eth2 MAC 907. Outside Eth MAC 904 is not controlled by a device driver. MAC 904 is configured in Promiscuous mode to pass all frames without any filtering for network monitoring. Initialization of this MAC is coordinated between the hardware instantiation of the MAC and any other necessary management processor initialization. Outside Eth MAC 904 registers are visible only in the memory maps of the management processor 906. Interrupts for Outside Eth MAC 904 are routable only to the management processor 906. The XGMAC supports several interruptible events that the CPUs may want to monitor, including any change in XGMII link fault status, hot-plugging or removal of PHY, alive status or link status change, and any RMON counter reaching a value equal to the threshold register.

In some cases, there may be Preamble, Start of Frame, and Inter-Frame gap fields across XAUI, depending on the specific micro-architecture. The routing frame header processor may standardize these fields. The XAUI interface may need some or all of these fields. In this case, the Routing Header processor at area 910*d* needs to add these going into the switch, and to remove them leaving the switch. To reduce the number of bytes that need to be sent over XAUI, these three fields may be removed (if the XAUI interface allows it). In this case, the Routing Header processor at area 910*b* will need to strip these going into the switch, and add them back leaving the switch.

The routing frame header processor receives an Ethernet frame from a MAC, sending a routing frame to the switch. It also standardizes the preamble, start of frame, and inter-frame gap fields, prepends a Routing Header, and receives a routing frame from the switch, sending the Ethernet frame into a MAC. This processor then strips the Routing Header and standardizes the preamble, start of frame, and inter-frame gap fields. Note that all frames that are flowing within the fabric are routing frames, not Ethernet frames. The Ethernet frame/routing frame conversion is done only as the packet is entering or leaving the fabric via a MAC. Note also that the routing logic within the switch may change the value of fields within the routing frame. The Ethernet frame is never modified (except the adding/removing of the preamble, start of frame, and inter-frame gap fields).

The routing frame is composed of the routing frame header plus the core part of the Ethernet frame, and is structured as shown in Table 1, below:

TABLE 1

| Routing Frame Header | Ethernet Frame Packet | | | | |
|---|---|---|---|---|---|
| RF Header | MAC destination | MAC Source | Ethertype/ Length | Payload (data and padding) | CRC32 |

The routing frame header consists of the fields shown in Table 2, below:

TABLE 2

| Field | Width (Bits) | Notes |
|---|---|---|
| Domain ID | 5 | Domain ID associated with this packet. 0 indicates that no domain has been specified. |
| Mgmt Domain | 1 | Specifies that the packet is allowed on the private management domain. |
| Source Node | 12 | Source node ID |
| Source Port | 2 | 0 = MAC0, 1 = MAC1, 2 = MAC_management processor, 3 = MAC_OUT |
| Dest Node ID | 12 | Destination node ID |
| Dest Port ID | 2 | 0 = MAC0, 1 = MAC1, 2 = MAC_management processor, 3 = MAC_OUT |
| Header Type | 1 | Header Type (0 = Routing Frame, 1 = Control Frame) |
| RF Type | 2 | Routing Frame Type (0 = Unicast, 1 = Multicast, 2 = Neighbor Multicast, 3 = Link Directed) |
| TTL | 6 | Time to Live - # of hops that this frame has existed. Switch will drop packet if the TTL threshold is exceeded (and notify management processor of exception). |
| Broadcast ID | 5 | Broadcast ID for this source node for this broadcast packet. |
| Checksum | 32 | Checksum of the frame header fields. |

If a switch receives a packet that fails the checksum, the packet is dropped, a statistic counter is incremented, and the management processor is notified.

Figure 5B:
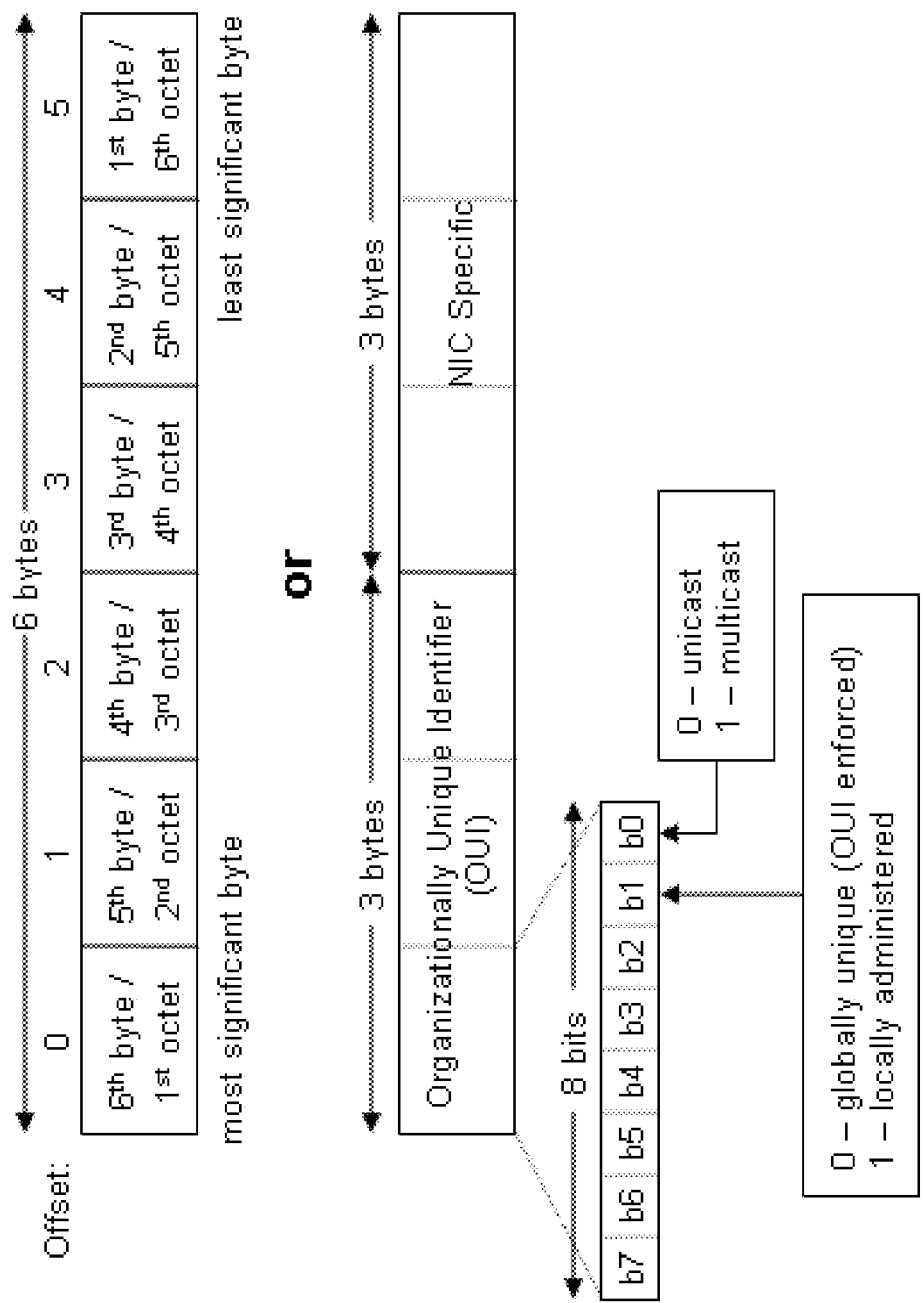
FIG. 5B illustrates the MAC address encoding.

The routing frame processor differentiates between several destination MAC address encodings. As a reminder, MAC addresses are formatted as shown in FIG. 5*b*. The following table describes the usage of the 3 byte OUI and 3 byte NIC specific field within the MAC address. One of the novel aspects of the system and method disclosed herein is the use of additional address bits to encode an internal to external MAC mapping, as shown also in the Table 3, below, in the second entry under "Hits Node Local MAC Lookup CAM Entry".

TABLE 3

| MAC Address Type | 3 bytes OUI | 3 bytes NIC Specific | Operation |
| --- | --- | --- | --- |
| Arbitrary MAC Address Misses MAC Lookup CAM | 23 bits: Arbitrary 1 bit: Multicast bit not set (OUI != Switch OUI) | 24 bits: Arbitrary | Packet unicast routed to gateway node's Outlink port |
| Arbitrary MAC Address Hits Node Local MAC Lookup CAM Entry | 23 bits: Arbitrary 1 bit: Multicast bit not set (OUI != Switch OUI) | 22 bits: Arbitrary 2 bits: Port ID | Packet unicast routed to Node ID obtained from MAC Lookup CAM and Port ID from MAC Address |
| Arbitrary MAC Address Hits Non-Node Local MAC Lookup CAM Entry | 23 bits: Arbitrary 1 bit: Multicast bit not set (OUI != Switch OUI) | 24 bits: Arbitrary | Packet unicast routed to Node ID and Port ID obtained from MAC Lookup CAM |
| Node Encoded Unicast | 23 bits: Switch OUI 1 bit: Multicast bit not set | 8 bits: Fabric ID 2 bits: Node Encoded Magic Number 12 bits: Node ID 2 bits: Port ID | Packet unicast routed to Node ID and Port ID from MAC Address. |
| Link Encoded Unicast | 23 bits: Switch OUI 1 bit: Multicast bit not set | 8 bits: Fabric ID 2 bits: Link Encoded Magic Number 9 bits: Reserved 3 bits: Link Number (0-4) 2 bits: Port ID | Packet sent down specific Link Number and to Port ID from MAC Address. |
| Multicast/ Broadcast | 23 bits: Arbitrary 1 bit: Multicast bit set (OUI != Switch OUI) | 24 bits: Arbitrary | Packet broadcast routed through fabric and gateways. |
| Neighbor Multicast | 23 bits: Switch OUI 1 bit: Multicast bit set | 8 bits: Fabric ID 2 bits: Neighbor Multicast Magic Number 14 bits: Reserved | Packet sent through all fabric links to neighboring nodes and not rebroadcast to other nodes |

Further, other novel aspects can be found in Table 3 under "Node Encoded Unicast" as well as "Link Encoded Unicast," allowing one internal node or link to address all external MAC sections, and the "Neighbor Multicast" entry, allowing a multicast to neighboring nodes.

Note that the values Node Encoded Magic Number, Link Encoded Magic Number, and Neighbor Multicast Magic Number are constant identifiers used for uniquely identifying these MAC address types. The term "magic number" is a standard industry term for a constant numerical or text value used to identify a file format or protocol.

The header processor contains a MAC Lookup CAM (Content Addressable Memory), macAddrLookup, that maps from 6 byte MAC addresses to 12-bit Node IDs, as shown in Table 4, below.

TABLE 4

| MAC Lookup CAM Input | | MAC Lookup CAM Output | |
| --- | --- | --- | --- |
| Node Local | MAC Address | Node ID | Port ID |
| 1 bit | 6 bytes | 12 bits | 2 bits |

The number of rows in this CAM is implementation dependent, but would be expected to be on the order of 256-1024 rows. The management processor initializes the CAM with Node ID mappings for all the nodes within the fabric. There are two types of rows, depending upon the setting of the Node Local bit for the row. The Node Local field allows a 4:1 compression of MAC addresses in the CAM for default MAC addresses, mapping all four MACs into a single row in the CAM table, which is Table 5, below.

TABLE 5

| MAC Address EntryType | Node Local | MAC Address | Port ID |
|---|---|---|---|
| Node Local | 1 | A Node Encoded Address refers to a Calxeda assigned MAC address for a node. It encodes the port # (MAC0, MAC1, management processor, Rsvd) into a 2-bit Port ID in the lowest two bits of the NIC address field. Ignores low 2 bits during match. | Taken from low 2 bits of MAC Address Input |
| Arbitrary | 0 | Matches against all 6 bytes | Taken from CAM Output field |

The arbitrary rows in the CAM allow mapping of the MAC address aliases to the nodes. Linux (and the MACs) allow the MAC addresses to be reassigned on a network interface (e.g., with ifconfig eth0 hw ether 00:80:48:BA:D1:30). This is sometime used by virtualization/cloud computing to avoid needing to re-ARP after starting a session.

The switch architecture provides for a secondary MAC Lookup CAM that only stores the 3 bytes of the NIC Specific part of the MAC address for those addresses that match the Switch OUI. The availability of this local OUI CAM is determined by the implementation. See Table 6, below.

TABLE 6

| MAC Lookup CAM Input | MAC Lookup CAM Output | |
|---|---|---|
| MAC Address NIC Specific | Node ID | Port ID |
| 3 bytes | 12 bits | 2 bits |

The maximum number of nodes limitation for three types of MAC address encodings may be evaluated as follows:

1. Default MAC Addressees—management processor sets Node Local mappings for each of the nodes in the fabric. There is one entry in the CAM for each node. Max # of nodes is controlled by maximum # of rows in the MAC Address Lookup CAM.
2. Node Encoded Addresses—All the MACs are reprogrammed to use Node Encoded Addresses. In this way the Node IDs are directly encoded into the MAC addresses. No entries in the MAC Lookup CAM are used. Max # of nodes is controlled by maximum # of rows in the Unicast lookup table (easier to make big compared to the Lookup CAM).
3. Arbitrary MAC Address Aliases—Takes a row in the CAM. As an example, a 512-row CAM could hold 256 nodes (Node local addresses)+1 MAC address alias per node.

Since the Lookup CAM is only accessed during Routing Header creation, the management processor actually only needs to populate a row if the MAC address within the fabric is being used as a source or destination MAC address within a packet. In other words, if two nodes never will talk to each other, a mapping row does not need to be created. But usually the management processor won't have that knowledge, so it's expected that mappings for all nodes are created in all nodes.

Table 7 defines how to set fields within the Routing Header for all the fields except for destination node and port.

TABLE 7

| Field | Set To |
|---|---|
| Domain ID | Set to the macDomainID field for the MAC that the packet came from. |
| Mgmt Domain | Set to the macMgmtDomain field for the MAC that the packet came from. |
| Source Node | Source MAC Node ID |
| Source Port | Source MAC Port ID |
| Header Type | Set to 0 for normal Routing Frame |
| RF Type | Multicast (if dstMAC multicast and not Neighbor Multicast format) |
| | Neighbor Multicast (if dstMAC multicast and is Neighbor Multicast format) |
| | Link Directed (is Link Encoded format) |
| | Unicast (if not one of the above) |
| TTL | 0 |
| Broadcast ID | If dstMAC is unicast - Set to 0 |
| | If dstMAC is multicast - Set to incremented local broadcast ID (bcastIDNext++ & 0xf) |

Table 8 defines how to set destination node and port for addresses within the fabric:

TABLE 8

| Case | Field: Destination Node | Field: Destination Port |
|---|---|---|
| Node Encoded Dest Address | Dest Node | Dest Port |
| Link Encoded Dest Address | Encoded Link | Dest Port |
| Hits Lookup CAM (node local) | CAM Dest Node | Dest MAC (low 2 bits) |
| Hits Lookup CAM (not node local) | CAM Dest Node | CAM Dest Port |

Table 9 defines how to set destination node and port for addresses outside the fabric:

TABLE 9

| Case | Field: Destination Node | Field: Destination Port |
|---|---|---|
| Came in an OUT Ethernet, but no secondary gateway defined | Drop packet, update statistics counter | |
| Came in an OUT Ethernet, and secondary gateway defined | secondaryEthGatewayNode[OUT] | OUT |
| From an Inside MAC, but no primary gateway defined | Drop packet, update statistics counter, and notify management processor | |
| From an Inside MAC, and primary gateway defined | primaryEthGatewayNode[fromPort] | OUT |

Additionally, the management processor software architecture of the system and method disclosed here currently depends on the ability of management processor nodes to "trust" each other. This more rigorous security on management processor to management processor communication is desirable, as well a better security on private management LANs across the fabric.

The multi-domain fabric architecture that has been described addresses the lack of VLAN support by creating secure "tunnels" and domains across the fabric, and it can interoperate with VLAN protected router ports on a 1:1 basis.

The approach to domain management in the system and method disclosed here is as follows: Support multiple domain IDs within the fabric. Allow each of the MACs within a node (management processor, MAC0, MAC1, Gateway) to be assigned to a domain ID individually (and tagged with domain 0 if not set). Allow each of the MACs within a node to have a bit indicating access to the management domain. The domain IDs associated with a MAC could only be assigned by the management processor, and could not be altered by the A9. For frames generated by MACs (both inside and outside), the routing frame processor would tag the routing frame with the domain ID and management domain state associated with that MAC. Domains would provide the effect of tunnels or VLANs, in that they keep packets (both unicast and multicast) within that domain, allowing MACs outside that domain to be able to neither sniff nor spoof those packets. Additionally, this approach would employ a five-bit domain ID. It would add options to control domain processing, such as, for example, a switch with a boolean per MAC that defines whether packets are delivered with non-defined (i.e., zero) domain ID, or a switch that has a boolean per MAC that defines whether packets are delivered with defined (non-zero) but non-matching domain IDs. A further option in the switch could turn off node encoded MAC addresses per MAC (eliminating another style of potential attack vector).

To keep management processor to management processor communication secure, the management domain bit on all management processor MACs could be marked. Generally, the management processor should route on domain 1 (by convention). Such a technique allows all the management processor's to tunnel packets on the management domain so that they cannot be inspected or spoofed by any other devices (inside or outside the fabric), on other VLANs or domains. Further, to provide a secure management LAN, a gateway MAC that has the management domain bit set could be assigned, keeping management packets private to the management processor domain. Additionally, the switch fabric could support "multi-tenant" within itself, by associating each gateway MAC with a separate domain. For example, each gateway MAC could connect to an individual port on an outside router, allowing that port to be optionally associated with a VLAN. As the packets come into the gateway, they are tagged with the domain ID, keeping that traffic private to the MACs associated with that domain across the fabric.

The switch supports a number of registers (aka CSRs, aka MMRs) to allow software or firmware to control the switch. The actual layout of these registers will be defined by the implementation. The fields listed in Table 10 are software read/write. All these registers need to have a mechanism to secure them from writing from the A9 (could be secure mode or on a management processor private bus).

TABLE 10

| Switch Fields | | |
|---|---|---|
| Field | Size | Notes |
| Adaptive | 1 bit | Adaptive unicast routing enabled. |
| broadcastVec[ ] | Array [CHANS] × 8 bits | Vector of ports to send broadcast packets received from a particular Link or MAC. CHANS = 8. Array elements are MAC0, MAC1, management processor MAC, LINK0, LINK1, LINK2, LINK3, LINK4. |
| linkDir[ ] | Array [LINKS] × 2 bits | Specifies link direction for each link (0 = DOWN, 1 = LATERAL, 2 = UP, 3 = Rsvd) LINKS = 5, Array elements are LINK0, LINK1, LINK2, LINK3, LINK4. |

TABLE 10-continued

| Switch Fields | | |
|---|---|---|
| Field | Size | Notes |
| linkState | 5 bits | Link state vector for each of the 5 links. Bit set indicates that link is active (trained and linked). |
| linkType[ ] | Array [LINKS] × 2 bits | Specifies type of each link (0 = Fabric Link, 1 = MAC Link, 2 = Reserved, 3 = Ethernet} |
| linkRate[ ] | Array [LINKS] × 3 bits | Specifies rate of each link (0 = 10G, 1 = 2.5G, 2 = 5.0G, 3 = 7.5G, 4 = 1G, 5-7 = Reserved} |
| linkEnable[ ] | Array [LINKS] × 1 bits | Specifies whether the Link Channel is enabled or not. |
| macEnable[ ] | Array [MACS] × 1 bits | Specifies whether the MAC Channel is enabled or not. |
| macAddrLookup | Lookup CAM which is described elsewhere in the document | MAC address lookup CAM to convert MAC addresses to Node IDs. |
| macAcceptOtherDomain[ ] | Array [MACS] × 1 bit | Defines that the MAC accepts packets that are tagged with a non-zero, non-matching domain ID. |
| macAcceptZeroDomain[ ] | Array [MACS] × 1 bit | Defines that the MAC accepts packets that are not tagged with a domain (i.e. 0 domain) |
| macRxDomainID[ ] | Array [MACS] × 5 bits | Defines that the MAC can receive packets from this Domain. A value of 0 indicates that the received domain ID for that MAC has not been set. |
| macRxMgmtDomain[ ] | Array [MACS] × 1 bit | Defines that the MAC may receive packets from the management domain. |
| macTxDomainID[ ] | Array [MACS] × 5 bits | Defines the value that will be put in the Domain ID field of the Routing Header for packets sent from this MAC. |
| macTxMgmtDomain[ ] | Array [MACS] × 1 bit | Defines the value that will be put in the Management Domain field of the Routing Header for packets sent from this MAC. |
| maxTTL | 6 bits | Maximum TTL count allowed in a Routing Header. Exceeding this number of hops causes the switch to drop the packet, update a statistic counter, and inform the management processor. |
| myNodeID | 12 bits | Need not be contiguous. Subtree's should ideally be numbered within a range to facilitate subtree network proxying. |
| myOUI | 3 bytes | 3 upper bytes of MAC addresses in fabric. Should be the same for all nodes in the fabric. |
| nodeRangeHi | 12 bits | Enabled with nodeRangeEnable. Specifies high node ID of node range match. |
| nodeRangeLo | 12 bits | Enabled with nodeRangeEnable. Specifies low node ID of node range match. |
| nodeRangeEnable[ ] | Array [CHANS] × 1 bit | Enables the expanded Node ID matching of [nodeRangeLo, nodeRangeHi] for a particular channel. Used for Network Proxying through a subtree. When enabled, a packet will be routed into the node (rather than through the node) if either DstNode == myNodeID OR (nodeRangeLo <= DstNode <= nodeRangeHi). |
| flowControlTxEnable[ ] | Array [CHANS] × 1 bit | When enabled, the Link or MAC Channel will transmit flow control messages. |
| flowControlRxEnable[ ] | Array [CHANS] × 1 bit | When enabled, the Link or MAC Channel will receive flow control messages and stop transmission. |

TABLE 10-continued

| | Switch Fields | |
|---|---|---|
| Field | Size | Notes |
| portRemap[ ] | Array [INT_PORTS] × 2 bits | Allows remapping of incoming destination port IDs to the internal port where it'll be delivered. This register defaults to an equivalence remapping. An example of where this will get remapped is during Network Proxy where the management processor will remap MAC0 packets to be sent to the management processor. INT_PORTS = 4. Array elements are the Ports enumeration (management processor, MAC0, MAC1, OUT). 2 bits contents are the Port's enumeration. |
| portRemapEnable[ ] | Array [CHANS] × 1 bit | Enables port remapping for particular Link or MAC Channels. |
| primaryEthGatewayNode[ ] | Array [INT_PORTS] of 12-bit | Specifies Node ID of primary Ethernet gateway for this node. Packets destined to node IDs that aren't within the fabric will get routed here. |
| promiscuousPortVec | 4 bits | Can be configured for Promiscuous Mode allowing traffic on one or more links to be snooped by the management processor or A9s in order to collect trace data or to implement an Intruder Detection System (IDS). This causes all traffic passing through the switch to be copied to the internal ports defined by this port vector. |
| routeForeignMACsOut | 1 bit | When enabled, a MAC address that does not contain a myOUI address, will not check the MAC lookup CAM, and will get treated as a MAC lookup CAM miss, thus getting routed to the gateway port. This saves latency in the common case of not populating the CAM with foreign MAC aliases. |
| secondaryEthGatewayNode | 12-bit | Specifies Node ID of secondary Ethernet gateway. Incoming (from OUT) packets routing through the fabric will be sent here. |
| unicastPortsFromOtherExt Gateways | 1 bit | An incoming unicast from an external gateway will get the gateway node put into the source node field of the Routing Header. Upon reaching the destination node, this bit will be checked. When the bit is clear, the external gateway node must match the destination gateway node for it to be delivered to internal ports. This is to handle the case where the fabric is connected to an external learning switch that hasn't yet learned the mac/port relationship, and floods the unicast packet down multiple ports. This will prevent a fabric node from getting the unicast packet multiple times. |
| unicastRoute[ ] | Array [NODES] of 10 bits | Link vector of unicast next route. 10 bits are made up of a 2-bit weight for each of 5 links. |

The registers shown in Table 11 are contained within the Switch implementation, but need not be software accessible.

TABLE 11

Non-Software Accessible Switch Fields

| Field | Size | Notes |
|---|---|---|
| bcastIDNext[ ] | Array [INT_PORTS] × 5 bits | Next broadcast sequence ID to issue next. Hardware will increment this for each broadcast packet initiated by this node. |
| bcastIDSeen[ ] | Array [BCAST_ID_LEN] of 5 bits. | FIFO list of broadcast tags seen by this node. |
| bcastIDSeenNext | # bits to index into BCAST_ID_LEN | Next array position into bcastIDSeen[ ] to insert a broadcast tag. |

Note that software should be able to update the routing tables (unicastRoute) and the macAddrLookup CAM atomically with respect to active packet routing. One implementation will be to hold off routing access to these tables during an update operation.

Network Proxy

Figure 6:
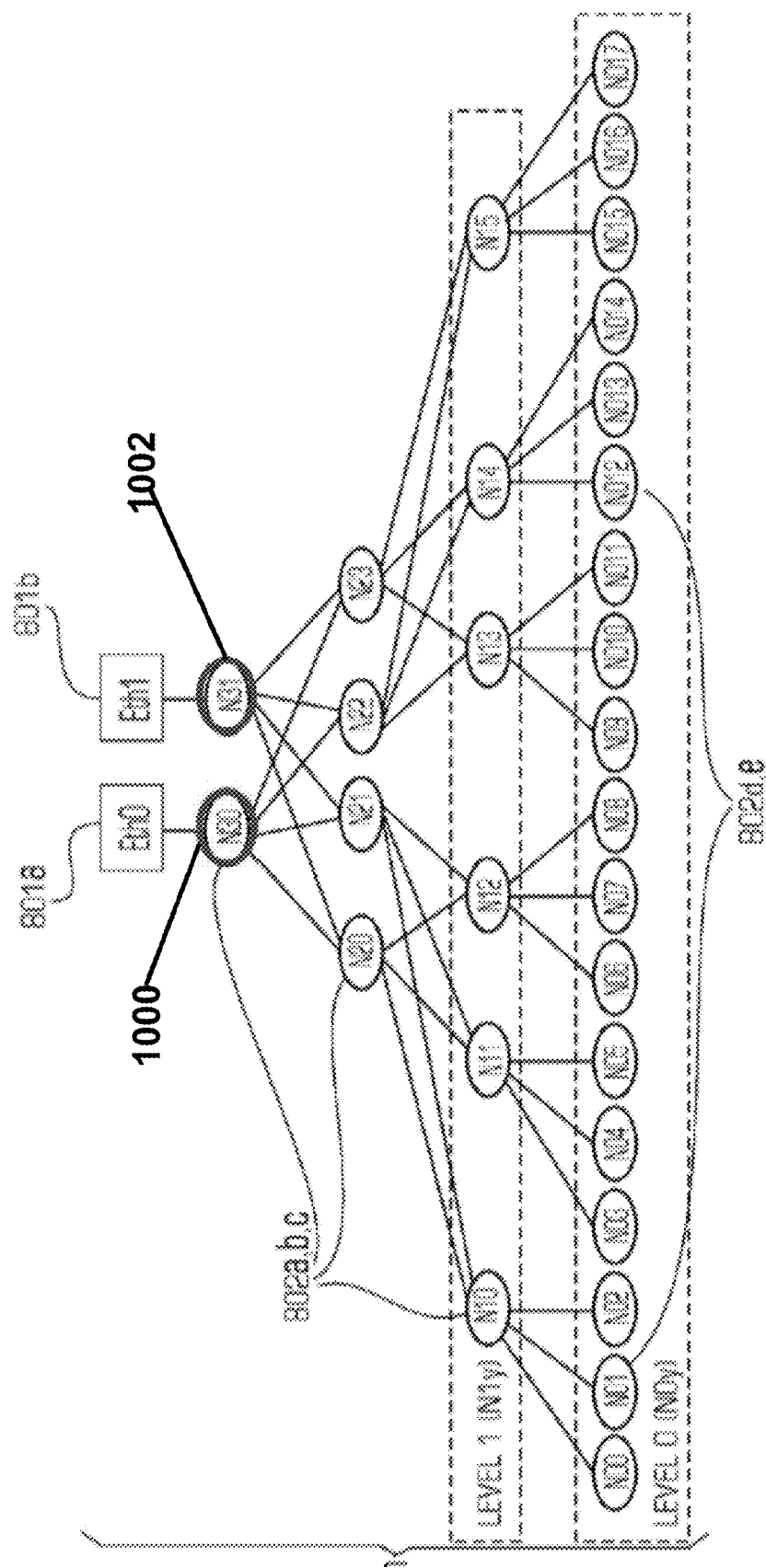
FIG. 6 illustrates a method for proxying using the switch.

FIG. 6 illustrates a method for proxying using the switch described above. Unlike a client computer with an Ethernet controller, a node 1001 or 1002 in a fabric shown in FIG. 6 may operate as a proxy for a node or a whole subtree of other nodes (N01-N017, N10-N15 and N20-N23 for example as shown in FIG. 6) keeping network presence alive for a whole tree of nodes. In implementation, the proxying can be done by a MAC for other MACs on the same Node or can be done by the MAC(s) on one Node for a range of other Nodes. It is well known that a large amount of electricity is used by electronic devices that are on solely for the purpose of maintaining network connectivity while they might be asleep and the network proxy of the fabric reduces that energy consumption. In the switch fabric and fabric described above, the concept of network proxy is the ability of the main processors (FIG. 5A, 905) to maintain network presence while in a low-power sleep/hibernation state, and intelligently wake when further processing is required.

As is known, some protocols require a processor to be fully powered-up. Some examples are: 1) ARP packets—must respond because, if no response, then the processor becomes "unreachable"; 2) TCP SYN packets—must respond because, if no response, then an application is "unreachable"; 3) IGMP query packets—must respond because if no response, then multicast to the processor is lost; and 4) DHCP lease request—must generate because, if no lease request, then the processor will lose its IP address. Thus, when proxying, each incoming packet can be identified and then handled accordingly, as described below in more detail.

Node Proxy Use Sequence

A proxy use sequence for the node in FIG. 5A would be of the form:

Management processor maintains the IP to MAC address mappings for MAC0 and MAC1 on the node. This can be done via either explicit communication of these mappings from the main processor OS to the management processor, or can be done implicitly by having the management processor snoop local gratuitous ARP broadcasts.

The main processor coordinates with the management processor to go to a low power dormant state. During this transition, the management processor sets up the proxying in order to route MAC0 and MAC1 traffic to the management processor.

The management processor processes any incoming MAC0/MAC1 packets. There are 3 categories of processing:

Respond to some classes of transactions that require simple responses (e.g. ARP responses, NetBIOS datagrams and ICMP ping).

Dump and ignore some classes of packets, typically unicast or broadcast packets that are targeting other computers.

Decide that the main processor must be woken to process some classes of packets, such as TCP SYN packets. The management processor will wake the main processor, undo the Port ID remapping register, and re-send the packets back through the switch where they will get rerouted back to MAC0/1.

Keep Alive Messages

It is common in servers for there to be an ongoing set of messages between servers that fall into the category of keep alive messages.

A keep alive is a message sent by one device to another to check that the link between the two is operating, or to prevent this link from being broken. A keep alive signal is often sent at predefined intervals. After a signal is sent, if no reply is received the link is assumed to be down and future data will be routed via another path or to another node.

Variants of the keep alive messages are used to see not only whether a node is available, but also whether the OS or even an application running on the node is available.

One side effect of these keep alive messages targeting a node is that it may make it difficult for the node to transition to a deep power saving state because it keeps getting hit with these periodic messages to check availability. This is another class of message that can be handled with this network proxy technique and offload response of these keep alive messages to the management processor, allowing the main processors to stay in a deep power saving state (sleep, hibernate, or powered off).

Port Remapping Proxy

One MAC on a particular node can proxy for one or more other MACs on the same node by using Port Remapping Proxy. For example, if the processor 905 shown in FIG. 5A is going to be powered down, the management processor 906 can program the fabric switch to redirect any packets that are sent to processor 905 MACs to instead be sent to the management processor 906.

There is a Port Remapping (portRemap) field for each of the four MACs in the fabric switch that allows packets destined for a particular MAC to be routed to a another MAC instead. There is also a single bit Port Remapping Enable (portRemapEnable[ ]) field for each channel which determines whether the Port Remapping field should apply to packets received on this channel or not.

To begin proxying for another MAC, in one embodiment, the management processor 906 may first disable the MAC Channel FIFOs for the MAC that will be proxied for, any packets in the FIFOs should be allowed to drain first and then the MAC and DMA can be shutdown. Then, the Port Remapping fields can be used to indicate how the packets meant for the MAC that is being proxied for are to be redirected. Once these fields are programmed, any packets that are subsequently received that are destined for the MAC that is being proxied for on a Link or MAC Channel that has Port Remapping enabled would be redirected to the proxy MAC.

To end proxying for another MAC, the MAC Channel FIFOs should be first enabled and started, the MAC and DMA should be enabled and then the Port Remapping fields should be changed. Once the Port Remapping fields are changed, the MAC Channel will start receiving packets that were sent to it. For example, when the switch is to deliver a packet to an internal MAC0 port (e.g. FIG. 5A, 902), this Port Remapping CSR allows software to remap MAC0 to the management processor MAC (e.g. FIG. 5A, 907) and have the packet delivered to the management processor for Network Proxy processing. This remapping CSR could also be used to remap MAC1 traffic to MAC0, or MAC1 traffic to the management processor.

The Port Remapping Enable field allows some Link or MAC Channels to have packets received on those channels to be redirected based on the Port Remapping while other Link or MAC Channels the packets received will not be redirected based on Port Remapping. For example, enable Port Remapping for all channels except for the management processor MAC Channel, so that packets received on all channels except for the management processor MAC Channel that are destined for an internal MAC0 port (e.g. FIG. 5A, 902) be redirected to the management processor MAC (e.g. FIG. 5A, 907), but all packets received on the management processor MAC Channel be unaffected by Port Remapping. This allows the management processor MAC to send packets to the MAC0 port even when Port Remapping is enabled for MAC0 on all other Link and MAC Channels.

Node Range or Set Based Node Proxy

Figure 7A:
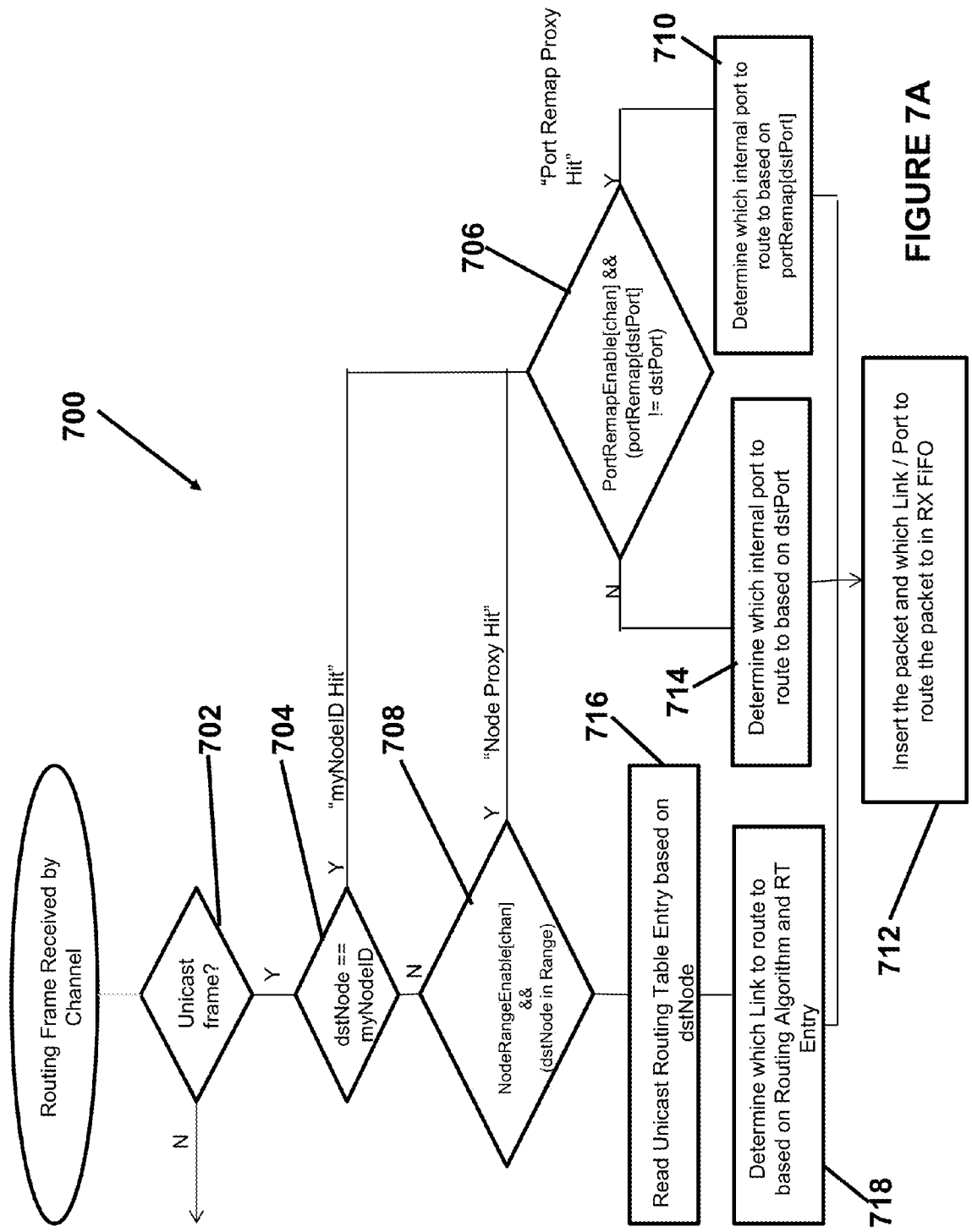
FIG. 7A illustrates a method for proxy routing using a node range based node proxy.

FIG. 7A illustrates a method 700 for proxy routing using a node range based or set based node proxy.

In the system, one Node can proxy for a set of other Nodes. This would be used when an entire branch of the Fabric is to be powered off. When one Node acts as the proxy for a range of Nodes, the MACs on the proxy Node represent the MACs for all of the Nodes in the range. In other words, if a packet is being sent to MAC1 on a Node that is being proxied for, the packet will be delivered to MAC1 on the proxy Node.

In the Routing process, the switch first looks at whether the Routing Header indicates the packet is a multicast packet or a unicast packet (702.) For unicast packets, the switch further looks at the Destination Node ID of the Routing Header to decide whether the packet is delivered to an internal port within the node, or gets routed to other XAUI connected nodes. This is done by first comparing the Destination Node ID (dstNode) in the Routing Header with myNodeID (704.)

If the Destination Node ID (dstNode) matches myNodeID, there is a myNodeID hit and the packet will be routed to an internal port. The switch must then determine the port to which the packet should be routed. To determine the port to which the packet should be routed, the switch checks if the Port Remap Proxy is enabled for the current channel, and whether the port identified by the Destination Port ID (dstPort) in the Routing Header is being remapped to another port (706.) If the dstPort does not match the portRemap[dstPort] then a Port Remap Proxy hit has occurred When a Port Remap Proxy hit occurs, the switch sends the packet to the port given by portRemap[dstPort] (710) and inserts the packet into the FIFO for rerouting (712) and the process is completed for that packet.

If the dstPort matches the portRemap[dstPort], then no proxy is occurring for that port and the switch sends the packet to the port given by dstPort (714) and inserts the packet into the FIFO for rerouting (712) and the process is completed for that packet.

In the Node Range Based Node Proxy embodiment, if the Destination Node ID (dstNode) does not match myNodeID, a Node Proxy Lookup is done (708) to check if the packet is destined for a Node for which the current Node is proxying. It requires checking whether Node Range Proxy is enabled for the current channel and whether the Destination Node ID (dstNode) in the Routing Header is within the Node ID range. The Node ID range causes the packet to be delivered to an internal port within the node if the following boolean equation is true:

(nodeRangeEnable[chan]&&
(nodeRangeLo<=Destination_Node<=nodeRangeHi))

This allows a node to proxy for a subtree of nodes whose Node IDs fall in a numerical range. This Node Proxy Lookup is done prior to the Routing Table lookup, so that the Routing Table memory access can be avoided if the Node Proxy Lookup hits.

If the Node Proxy hits, the packet will be routed to an internal port and the switch must then determine the port to which the packet should be routed. The processes to determine the port to which the packet should be routed 706, 714, 710, and 712 are the same as described above with reference to FIG. 7A and thus are not repeated herein.

If the Node Proxy Lookup fails, then the switch reads the unicast routing table entry based on the dstNode (716) and determines the link to route the packet to based on a routing algorithm and Routing Table entry (718), inserts the packet into the FIFO (712) and the process is completed for the packet.

Routing Table Based Node Proxy

Figure 7B:
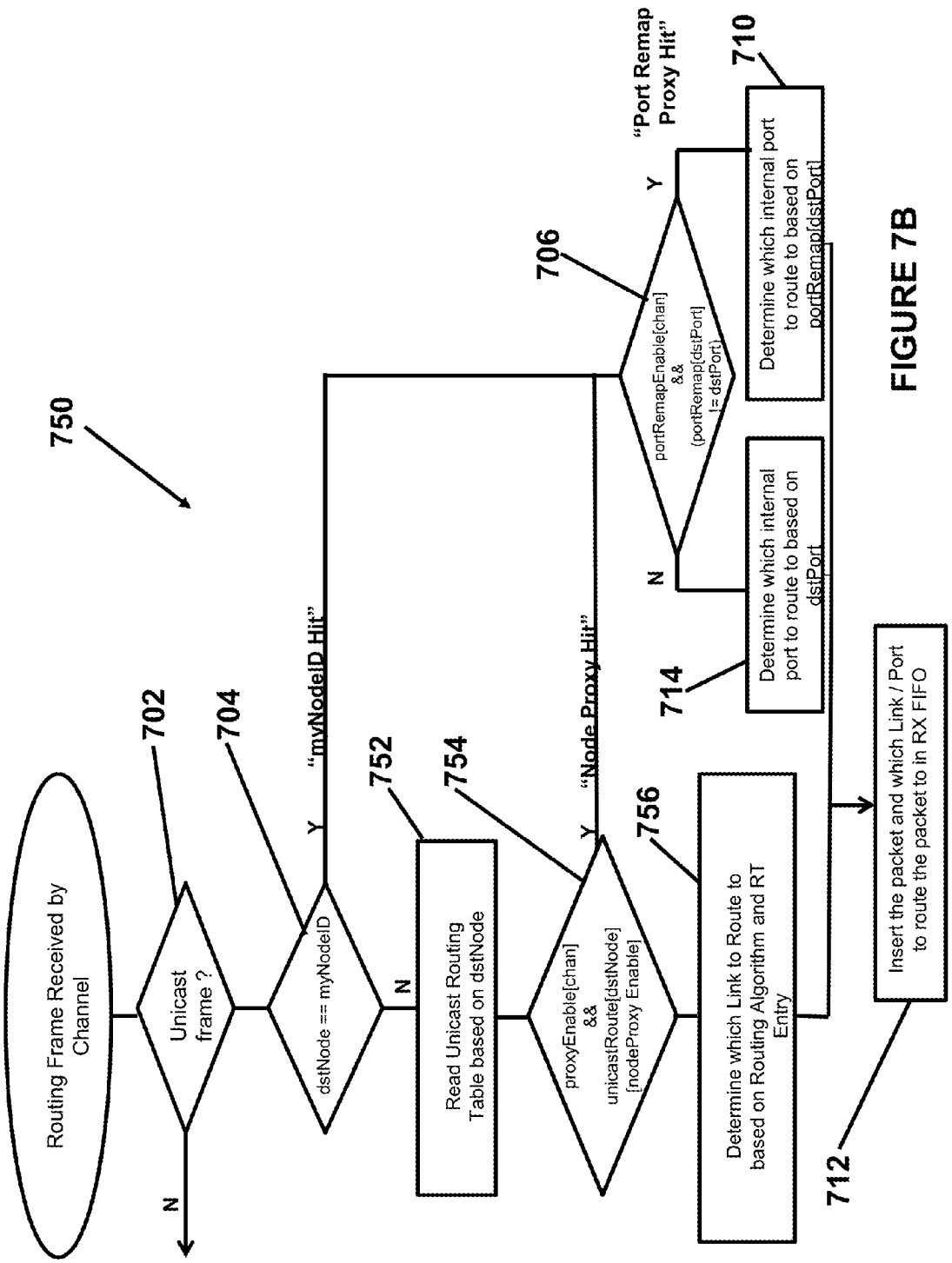
FIG. 7B illustrates a method for proxy routing using a routing table based node proxy.

FIG. 7B illustrates a method 750 for proxy routing using a routing table based node proxy that may be used in an alternative embodiment. In the alternate embodiment, there is an extra field in each entry of the Routing Table which determines for which Node IDs the current node is proxying. The Routing Table contains one entry per Node in the fabric and the index into the Routing Table is the Destination Node ID. In addition to the Routing Weightings for each Link, there is a single bit boolean that indicates whether the current Node is proxying for the node associated with the Routing Table entry. This boolean is called nodeProxyEnable. The unicast Routing Table definition is shown in Table 10.

TABLE 10

Unicast Routing Table Definition for Routing Table Based Proxy

| Field | Size | Notes |
| --- | --- | --- |
| unicastRoute[NODES] | Array [NODES] of 11 bits | Link vector of unicast next route. 10 bits is 2-bit weight field for each of 5 links, plus a 1-bit nodeProxyEnable field for each entry. |

In the method using the routing table, the processes 702-706 and 710-714 are the same as described above with reference to FIG. 7A and thus are not repeated herein. In the method, if the myNodeID is not hit, the switch reads the unicast routing table based on dstNode (752). The switch then determines if a Node Proxy hit has occurred using the nodeProxyEnable bit in the Routing Table using the following boolean equation:

proxyEnable[chan]&&unicastRoute[*dst*Node]
[nodeProxyEnable]

If the above boolean equation is true, then a Node Proxy hit has occurred and the method proceeds to process 706 as described above. If the above boolean equation is false, then the switch determines which link to route the packet to based on a routing process and a Routing Table entry (756), inserts the packet into the FIFO (712) and the process is completed for the packet.

The Routing Table based Proxy embodiment differs from the Node Range based Proxy embodiment in that any node in the fabric can be proxied for regardless of the Node ID number while in the Node Range embodiment, the Node IDs that are to be proxied for must be in numerical order.

MAC Lookup CAM-Based Node Proxy

It is also possible to have one node proxy for another using the macAddrLookup mechanism described above. The MAC Lookup CAM takes a MAC address as input and returns a destination node and port. By changing the CAM to return a different node and port for a given MAC address, traffic destined for one system can be directed to another.

Specifically, when the system configures one server as a proxy for another, the management processors across the cluster need to change the MAC Lookup CAM on all of the nodes of a cluster to change the line for the MAC that is being shifted to point to the new destination server. As can be seen in Table 6 above, the required change is just to the Node ID field. Since all of the management processors are in contact with each other across the fabric, the change can be initiated by any node, but the CAM entry needs to be consistent across all nodes.

One benefit of this approach is that a set of MAC addresses can be shared across a set of nodes. When there is insufficient load to require all of the nodes, the MAC addresses can be consolidated across a subset of the nodes with the others powered off. When the load increases additional servers can be powered on and the shared set of MAC addresses redistributed to balance the load.

Wake-on-LAN Magic Packet

In a traditional desktop computer, the computer to be woken is shut down (sleeping, hibernating, or soft off; i.e., ACPI state G1 or G2), with power reserved for the network card, but not disconnected from its power source. The network card listens for a specific packet containing its MAC address, called the magic packet, broadcast on the broadcast address for that particular subnet (or an entire LAN, though this requires special hardware or configuration). The magic packet is sent on the data link or layer 2 in the OSI model and broadcast to all NICs within the network of the broadcast address; the IP-address (layer 3 in the OSI model) is not used. When the listening computer receives this packet, the network card checks the packet for the correct information. If the magic packet is valid, the network card takes the computer out of hibernation or standby, or starts it up.

The magic packet is a broadcast frame containing anywhere within its payload: 6 bytes of ones (resulting in hexadecimal FF FF FF FF FF FF), followed by sixteen repetitions of the target computer's MAC address. Since the magic packet is only scanned for the string above, and not actually parsed by a full protocol stack, it may be sent as a broadcast packet of any network- and transport-layer protocol. It is typically sent as a UDP datagram to port 0, 7 or 9, or, in former times, as an IPX packet.

Using the Network Proxy architecture just described, the management processor can support these Wake-On-LAN packets. It will get these broadcast packets, will know the MAC addresses for the other MACs on the node, and be able to wake up the main processor as appropriate. No further functionality is needed in the switch to support these Wake-on-LAN packets.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A node, comprising:
at least one processor associated with at least one first internal port, wherein the at least one first internal port has a first address;
a management processor associated with a second internal port, wherein the second internal port has a second address; and
a port remapping component configured to indicate that the first address is remapped to the second address, wherein the port remapping component is configured to activate a port remapping enable field, and wherein the port remapping enable field is specific to a given channel;
wherein the management processor is configured to disable a first-in first-out buffer of the at least one processor and to receive traffic destined for the at least one processor as a proxy of the at least one processor via the port remapping component and in response to the at least one processor being in a low power state.

2. The node of claim 1, wherein the management processor is further configured to process an incoming packet that is to be remapped to the management processor.

3. The node of claim 2, wherein the management processor is further configured to respond to the incoming packet if required for a particular protocol.

4. The node of claim 2, wherein the management processor is further configured to ignore the incoming packet if destined for another node.

5. The node of claim 2, wherein the management processor is further configured to wake up the at least one processor, if in the low power state, for the incoming packet that is to be processed by the at least one processor.

6. The node of claim 2, wherein the incoming packet is a keep alive message, and wherein the management processor is further configured to respond to the keep alive message.

7. The node of claim 3, wherein the incoming packet required for a protocol is an ARP packet, a NetBIOS datagram, or an ICMP ping.

8. The node of claim 4, wherein the incoming packet destined for another node is a broadcast packet or a unicast packet.

9. The node of claim 5, wherein the incoming packet that is to be processed by the at least one processor is a TCP SYN packet or a magic packet.

10. The node of claim 5, wherein the management processor is further configured to:
reset the port remapping component to cancel the remapping; and
resend the incoming packet back to the at least one processor.

11. A method, comprising:
associating at least one processor in a node with at least one first internal port, wherein the at least one first internal port has a first address;
associating a management processor in the node with a second internal port, wherein the second port has a second address;
setting up a port remapping component which indicates that the first address is remapped to the second address, wherein the port remapping component is configured to activate a port remapping enable field, and wherein the port remapping enable field is specific to a given channel;

disabling, by the management processor, a first-in first-out buffer of the at least one processor; and receiving, by the management processor as a proxy of the at least one processor, traffic destined for the at least one processor via the port remapping component and in response to the at least one processor being in a low power state.

12. The method of claim 11, further comprising responding, by the management processor, to a packet remapped to the management processor if required for a particular protocol.

13. The method of claim 11, further comprising ignoring, by the management processor, a packet remapped to the management processor if destined for another node.

14. The method of claim 11, further comprising waking up the at least one processor, if in the low power state, for a packet that is to be processed by the at least one processor.

15. The method of claim 11, further comprising responding, by the management processor, to a keep alive message that is remapped to the management processor.

16. The method of claim 12, wherein the packet is an ARP packet, a NetBIOS datagram, or an ICMP ping.

17. The method of claim 13, wherein the packet destined for another node is a broadcast packet or a unicast packet.

18. The method of claim 14, wherein the packet that is to be processed by the at least one processor is a TCP SYN packet or a magic packet.

19. The method of claim 14, further comprising:
resetting the port remapping component to cancel the remapping; and
resending a packet back to the at least one processor.

20. A fabric, comprising:
a plurality of nodes interconnected to each other, wherein each of the plurality of nodes includes:
at least one processor, wherein the at least one processor is associated with at least one internal port of a node in which the at least one processor is located, and wherein the at least one internal port has a first address in the fabric;
a management processor, wherein the management processor is associated with a second internal port of the node, and wherein the second internal port has a second address in the fabric; and
a port remapping component configured to indicate that the first address is remapped to the second address, wherein the port remapping component is configured to activate a port remapping enable field, and wherein the port remapping enable field is specific to a given channel;
wherein the management processor is configured to disable a first-in first-out buffer of the at least one processor and to receive traffic destined for the at least one processor as a proxy of the at least one processor via the port remapping component and in response to the at least one processor being in a low power state.

21. The fabric of claim 20, wherein the management processor is further configured to process an incoming packet that is to be remapped to the management processor.

22. The fabric of claim 21, wherein the management processor is further configured to respond to the incoming packet if required for a particular protocol.

23. The fabric of claim 21, wherein the management processor is further configured to ignore the incoming packet if destined for another node.

24. The fabric of claim 21, wherein the management processor is further configured to wake up the at least one processor, if in the low power state, for the incoming packet that is to be processed by the at least one processor.

25. The fabric of claim 21, wherein the incoming packet is a keep alive message, and wherein the management processor is further configured to respond to the keep alive message.

26. The fabric of claim 22, wherein the incoming packet for a protocol is an ARP packet, a NetBIOS datagram, or an ICMP ping.

27. The fabric of claim 23, wherein the incoming packet destined for another node is a broadcast packet or a unicast packet.

28. The fabric of claim 24, wherein the incoming packet that is to be processed by the at least one processor is a TCP SYN packet or a magic packet.

29. The fabric of claim 24, wherein the management processor is configured to:
reset the port remapping component to cancel the remapping; and
resend the incoming packet back to the at least one processor.

30. An apparatus, comprising:
a plurality of nodes interconnected to each other to form a switching fabric, wherein each of the plurality of nodes is associated with a respective node ID in the switching fabric;
a proxy node configured to be a proxy for at least one of the plurality of nodes that have entered a low power state; and
a node proxy component configured to indicate that at least one of the respective node IDs is proxied to the proxy node, wherein the node proxy component comprises a routing table proxy component configured to determine if a node ID is being proxied to the proxy node;
wherein the proxy node is further configured to receive traffic destined for at least one of the plurality of nodes via the node proxy component and in response to the at least one of the plurality of nodes being in a low power state.

31. The apparatus of claim 30, wherein the routing table proxy component comprises a routing table with a proxy field configured to determine if a node ID is being proxied to the proxy node.

32. The apparatus of claim 30, wherein the proxy node is further configured to respond to an incoming packet, remapped to the proxy node, if required for a particular protocol.

33. The apparatus of claim 30, wherein the proxy node is further configured to ignore an incoming packet, remapped to the proxy node, if destined for a node that is not being proxied by the proxy node.

34. The apparatus of claim 30, wherein the proxy node is further configured to wake up a proxied node for an incoming packet that is to be processed by the proxied node.

35. The apparatus of claim 30, wherein the proxy node is further configured to respond to a keep alive message remapped to the proxy node.

36. The node of claim 32, wherein the incoming packet for a protocol is an ARP packet, a NetBIOS datagram, or an ICMP ping.

37. The node of claim 33, wherein the incoming packet destined for another node is a broadcast packet or a unicast packet.

38. The node of claim 34, wherein the incoming packet that is to be processed by the proxied node is a TCP SYN packet or a magic packet.

39. The apparatus of claim 34, wherein the proxy node is configured to:
reset the node proxy component to cancel the proxy; and
resend the incoming packet back to the proxied node.

40. A method, comprising:
  associating each of a plurality of nodes with a respective node ID, wherein the plurality of nodes are interconnected to each other to form a switching fabric;
  setting up a node proxy component which indicates that at least one of the respective node IDs is proxied to a proxy node, wherein the proxy node is configured to be a proxy for at least one of the plurality of nodes in response to the at least one of the plurality of nodes being in a low power state, wherein the node proxy component comprises a routing table proxy component configured to determine if a node ID is being proxied to the proxy node; and
  receiving, by the proxy node, traffic destined for the at least one of the plurality of nodes via the node proxy component and in response to the at least one of the plurality of nodes being in a low power state.

41. The method of claim 40, wherein the node proxy component further comprises a routing table with a proxy field that determines if a node ID is being proxied to the proxy node.

42. The method of claim 40, wherein the proxy node is further configured to respond to an incoming packet, remapped to the proxy node, if required for a particular protocol.

43. The method of claim 40, wherein the proxy node is further configured to ignore an incoming packet, remapped to the proxy node, if destined for a node that is not being proxied by the proxy node.

44. The method of claim 40, wherein the proxy node is further configured to wake up a proxied node for an incoming packet that is to be processed by the proxied node.

45. The method of claim 40, wherein the proxy node is further configured to respond to a keep alive message.

46. The method of claim 42, wherein the incoming packet is an ARP packet, a NetBIOS datagram, or an ICMP ping.

47. The method of claim 43, wherein the incoming packet destined for another node is a broadcast packet or a unicast packet.

48. The method of claim 44, wherein the incoming packet that is to be processed by the proxied node is a TCP SYN packet or a magic packet.

49. The method of claim 44, wherein the proxy node is further configured to:
  reset the proxy node component to cancel the proxy; and
  resend the incoming packet back to the proxied node.

* * * * *